United States Patent
Yang et al.

(10) Patent No.: US 9,568,065 B2
(45) Date of Patent: Feb. 14, 2017

(54) TRANSMISSION UNIT, POWER TRANSMISSION SYSTEM AND VEHICLE COMPRISING THE SAME

(71) Applicant: BYD COMPANY LIMITED, Shenzhen, Guangdong (CN)

(72) Inventors: Dongsheng Yang, Guangdong (CN); Yubo Lian, Guangdong (CN); Jintao Zhang, Guangdong (CN); Hongbin Luo, Guangdong (CN)

(73) Assignee: BYD COMPANY LIMITED, Shenzhen (CN)

( * ) Notice: Subject to any disclaimer, the term of this patent is extended or adjusted under 35 U.S.C. 154(b) by 177 days.

(21) Appl. No.: 14/644,818

(22) Filed: Mar. 11, 2015

(65) Prior Publication Data
US 2016/0069425 A1 Mar. 10, 2016

(30) Foreign Application Priority Data

Sep. 10, 2014 (CN) .......................... 2014 1 0460546
Sep. 10, 2014 (CN) ..................... 2014 2 0518258 U

(51) Int. Cl.
*F16H 3/08* (2006.01)
*F16H 3/00* (2006.01)
(Continued)

(52) U.S. Cl.
CPC .............. *F16H 3/006* (2013.01); *B60K 6/442* (2013.01); *B60K 6/52* (2013.01); *B60K 6/547* (2013.01);
(Continued)

(58) Field of Classification Search
CPC .. F16H 3/006; F16H 2003/0931; F16H 3/091; F16H 47/02
(Continued)

(56) References Cited

U.S. PATENT DOCUMENTS 4,132,133 A 1/1979 Ballendux
4,610,177 A 9/1986 Mahoney
(Continued)

FOREIGN PATENT DOCUMENTS

CN 2602978 Y 2/2004
CN 1618644 A 5/2005
(Continued)

OTHER PUBLICATIONS

European Search Report dated Dec. 10, 2015, issued in related European Patent Application No. 15158696.3 (8 pages).
(Continued)

*Primary Examiner* — Ha D Ho

(57) ABSTRACT

A transmission unit for a vehicle is provided. The transmission unit includes: a plurality of input shafts, each of the input shafts being provided with a shift driving gear thereon; a plurality of output shafts, each of the output shafts being provided with a shift driven gear configured to mesh with a corresponding shift driving gear; a motor power shaft; first and second motor gears fitted over the motor power shaft; a motor synchronizer disposed on the motor power shaft and between the first and second motor gears; in which the first motor gear is configured to rotate together with one of the input shafts; the second motor gear is configured to rotate together with one of the output shafts. A power transmission system including the transmission unit and a vehicle including the power transmission system are also provided.

23 Claims, 12 Drawing Sheets

(51) Int. Cl.
  *B60K 6/442* (2007.10)
  *B60K 6/52* (2007.10)
  *B60K 6/547* (2007.10)
  *B60K 7/00* (2006.01)
  *F16H 3/093* (2006.01)
  *B60K 17/16* (2006.01)
  *B60K 17/356* (2006.01)

(52) U.S. Cl.
  CPC ........... *B60K 7/0007* (2013.01); *B60K 17/165* (2013.01); *B60K 17/356* (2013.01); *F16H 3/093* (2013.01); *B60K 2007/0046* (2013.01); *B60K 2007/0061* (2013.01); *F16H 2003/0807* (2013.01); *F16H 2003/0822* (2013.01); *F16H 2003/0931* (2013.01); *F16H 2200/0056* (2013.01); *Y02T 10/6234* (2013.01); *Y02T 10/6265* (2013.01); *Y10S 903/917* (2013.01)

(58) Field of Classification Search
  USPC .......................... 74/330, 331, 333, 340, 661
  See application file for complete search history.

(56) References Cited

U.S. PATENT DOCUMENTS

| | | |
|---|---|---|
| 4,676,115 A | 6/1987 | Morscheck et al. |
| 5,586,613 A | 12/1996 | Ehsani |
| 5,890,392 A | 4/1999 | Ludanek et al. |
| 7,296,648 B2 | 11/2007 | Tatara et al. |
| 7,395,889 B2 | 7/2008 | Sugiyama et al. |
| 7,730,982 B2 | 6/2010 | Hidaka et al. |
| 8,505,400 B2 | 8/2013 | Mellet et al. |
| 8,523,734 B2 | 9/2013 | Mepham et al. |
| 8,579,059 B2 | 11/2013 | Teraya |
| 2002/0033059 A1 | 3/2002 | Pels et al. |
| 2002/0088291 A1 | 7/2002 | Bowen |
| 2002/0177504 A1 | 11/2002 | Pels et al. |
| 2003/0078134 A1 | 4/2003 | Kojima et al. |
| 2003/0173826 A1 | 9/2003 | Tazoe et al. |
| 2003/0183467 A1 | 10/2003 | Kozarekar |
| 2004/0204286 A1 | 10/2004 | Stridsberg |
| 2005/0139035 A1 | 6/2005 | Lee et al. |
| 2005/0241437 A1 | 11/2005 | Gray, Jr. et al. |
| 2007/0102211 A1 | 5/2007 | Nozaki et al. |
| 2007/0175723 A1 | 8/2007 | Blessing et al. |
| 2008/0070745 A1 | 3/2008 | Ogata |
| 2010/0031910 A1 | 2/2010 | Seufert et al. |
| 2010/0120580 A1 | 5/2010 | Mepham et al. |
| 2010/0320016 A1 | 12/2010 | Wang et al. |
| 2011/0098151 A1 | 4/2011 | Ziemer |
| 2011/0245033 A1 | 10/2011 | Sato et al. |
| 2011/0263379 A1 | 10/2011 | Liang et al. |
| 2012/0010041 A1 | 1/2012 | Soliman et al. |
| 2012/0053011 A1 | 3/2012 | Onomura et al. |
| 2012/0160044 A1 | 6/2012 | Kahl |
| 2012/0245781 A1 | 9/2012 | Kanamori et al. |
| 2012/0245783 A1 | 9/2012 | Tamagawa |
| 2012/0303201 A1 | 11/2012 | Tsuneishi et al. |
| 2012/0310461 A1 | 12/2012 | Maruyama et al. |
| 2013/0068056 A1 | 3/2013 | Van Batavia et al. |
| 2013/0192417 A1 | 8/2013 | Fujita et al. |
| 2013/0231848 A1 | 9/2013 | Roberts et al. |
| 2013/0288854 A1 | 10/2013 | Kobayashi |
| 2013/0345019 A1 | 12/2013 | Kaltenbach et al. |
| 2014/0128205 A1 | 5/2014 | Phillips et al. |

FOREIGN PATENT DOCUMENTS

| | | |
|---|---|---|
| CN | 1637327 A | 7/2005 |
| CN | 2716053 Y | 8/2005 |
| CN | 1699091 A | 11/2005 |
| CN | 1728192 A | 2/2006 |
| CN | 1876460 A | 12/2006 |
| CN | 101209666 A | 7/2008 |
| CN | 101209675 A | 7/2008 |
| CN | 101219662 A | 7/2008 |
| CN | 101380887 A | 3/2009 |
| CN | 101400536 A | 4/2009 |
| CN | 101407179 A | 4/2009 |
| CN | 201214410 Y | 4/2009 |
| CN | 101428612 A | 5/2009 |
| CN | 101450607 A | 6/2009 |
| CN | 101516708 A | 8/2009 |
| CN | 101549634 A | 10/2009 |
| CN | 201390137 Y | 1/2010 |
| CN | 101659203 A | 3/2010 |
| CN | 201511806 U | 6/2010 |
| CN | 101947915 A | 1/2011 |
| CN | 101973207 A | 2/2011 |
| CN | 101973260 A | 2/2011 |
| CN | 101983150 A | 3/2011 |
| CN | 102009587 A | 4/2011 |
| CN | 102030005 A | 4/2011 |
| CN | 102069701 A | 5/2011 |
| CN | 102079241 A | 6/2011 |
| CN | 102085795 A | 6/2011 |
| CN | 201849307 U | 6/2011 |
| CN | 201849308 U | 6/2011 |
| CN | 201907400 U | 7/2011 |
| CN | 102259583 A | 11/2011 |
| CN | 102259584 A | 11/2011 |
| CN | 102303517 A | 1/2012 |
| CN | 102343824 A | 2/2012 |
| CN | 102371893 A | 3/2012 |
| CN | 102381178 A | 3/2012 |
| CN | 202242966 U | 5/2012 |
| CN | 102490588 A | 6/2012 |
| CN | 202319868 U | 7/2012 |
| CN | 202319954 U | 7/2012 |
| CN | 202345366 U | 7/2012 |
| CN | 102642474 A | 8/2012 |
| CN | 102666169 A | 9/2012 |
| CN | 102673365 A | 9/2012 |
| CN | 102673382 A | 9/2012 |
| CN | 102678839 A | 9/2012 |
| CN | 102678871 A | 9/2012 |
| CN | 202429065 U | 9/2012 |
| CN | 102781698 A | 11/2012 |
| CN | 202641355 U | 1/2013 |
| CN | 202656855 U | 1/2013 |
| CN | 102910066 A | 2/2013 |
| CN | 102975607 A | 3/2013 |
| CN | 103029558 A | 4/2013 |
| CN | 101909912 B | 5/2013 |
| CN | 103144528 A | 6/2013 |
| CN | 103183026 A | 7/2013 |
| CN | 103237677 A | 8/2013 |
| CN | 103350639 A | 10/2013 |
| CN | 203283020 U | 11/2013 |
| CN | 203305832 U | 11/2013 |
| CN | 103527726 A | 1/2014 |
| CN | 103697118 A | 4/2014 |
| CN | 203516615 U | 4/2014 |
| CN | 103832263 A | 6/2014 |
| CN | 103867657 A | 6/2014 |
| CN | 103912640 A | 7/2014 |
| CN | 103921674 A | 7/2014 |
| CN | 203876574 U | 10/2014 |
| CN | 102555766 B | 11/2014 |
| CN | 203962884 U | 11/2014 |
| CN | 102555769 B | 12/2014 |
| CN | 204095490 U | 1/2015 |
| DE | 10239540 A1 | 3/2004 |
| DE | 102008002381 A1 | 12/2009 |
| DE | 102010028935 A1 | 11/2011 |
| DE | 102011115780 A1 | 4/2012 |
| DE | 102011086743 A1 | 5/2013 |
| DE | 102013201744 A1 | 8/2014 |
| EP | 1122109 A2 | 8/2001 |
| EP | 2210758 A1 | 7/2010 |
| EP | 2255986 A1 | 12/2010 |
| EP | 2279922 A1 | 2/2011 |
| EP | 2385270 A1 | 11/2011 |

(56) References Cited

FOREIGN PATENT DOCUMENTS

| | | | |
|---|---|---|---|
| EP | 2390127 A1 | 11/2011 |
| EP | 2439094 A1 | 4/2012 |
| EP | 2474434 A1 | 7/2012 |
| EP | 2508378 A1 | 10/2012 |
| EP | 2517938 A1 | 10/2012 |
| EP | 2641802 A2 | 9/2013 |
| EP | 2738030 A2 | 6/2014 |
| JP | S63-43856 A | 2/1988 |
| JP | H0993714 A | 4/1997 |
| JP | 2007-118751 A | 5/2007 |
| JP | 2012-187962 A | 10/2012 |
| JP | 2013-112073 A | 6/2013 |
| JP | 2013-126365 A | 6/2013 |
| JP | 2013-169831 A | 9/2013 |
| JP | 2013-241066 A | 12/2013 |
| KR | 10-0887797 B1 | 3/2009 |
| WO | WO 99/21263 A2 | 4/1999 |
| WO | WO 2008-031389 A1 | 3/2008 |
| WO | WO 2008/092353 A1 | 8/2008 |
| WO | WO 2010/054210 A1 | 5/2010 |
| WO | 2011138308 A1 | 11/2011 |
| WO | WO 2013/014510 A1 | 1/2013 |
| WO | WO 2013/031491 A1 | 3/2013 |

OTHER PUBLICATIONS

European Search Report dated Dec. 10, 2015, issued in related European Patent Application No. 15158701.1 (8 pages).
European Search Report dated Feb. 2, 2016, issued in related European Patent Application No. 15158686.4 (9 pages).
Non-Final Office Action dated Jun. 2, 2016, issued in related U.S. Appl. No. 14/526,816 (8 pages).
Non-Final Office Action dated Mar. 7, 2016, issued in related U.S. Appl. No. 14/527,600 (11 pages).
Non-Final Office Action dated Mar. 8, 2016, issued in related U.S. Appl. No. 14/527,410 (21 pages).
Non-Final Office Action dated May 31, 2016, issued in related U.S. Appl. No. 14/527,446 (9 pages).
Non-Final Office Action dated May 5, 2016, issued in related U.S. Appl. No. 14/527,496 (8 pages).
Non-Final Office Action dated Sep. 24, 2015, issued in related U.S. Appl. No. 14/527,522 (17 pages).
Chinese Search Report dated May 26, 2015, issued in related Chinese Application No. 201510024072.4 (7 pages).
Chinese Search Report dated May 26, 2015, issued in related Chinese Application No. 201510024073.9 (7 pages).
Chinese Search Report dated May 26, 2015, issued in related Chinese Application No. 201510024171.2 (7 pages).
Chinese Search Report dated May 26, 2015, issued in related Chinese Application No. 201510024172.7 (7 pages).
Chinese Search Report dated May 26, 2015, issued in related Chinese Application No. 201510024198.1 (7 pages).
Chinese Search Report dated May 27, 2015, issued in related Chinese Application No. 201510024215.1 (8 pages).
Chinese Search Report dated May 27, 2015, issued in related Chinese Application No. 201510024314.X (8 pages).
PCT International Search Report dated Jan. 16, 2015, issued in related International Application No. PCT/CN2014/089831 (15 pages).
PCT International Search Report dated Jan. 19, 2015, issued in related International Application No. PCT/CN2014/089840 (15 pages).
PCT International Search Report dated Jan. 21, 2015, issued in related International Application No. PCT/CN2014/089837 (14 pages).
PCT International Search Report dated Jan. 21, 2015, issued in related International Application No. PCT/CN2014/089846 (14 pages).
PCT International Search Report dated Jan. 21, 2015, issued in related International Application No. PCT/CN2014/089847 (13 pages).
PCT International Search Report dated Jan. 26, 2015, issued in related International Application No. PCT/CN2014/089841 (14 pages).
PCT International Search Report dated Jan. 28, 2015, issued in related International Application No. PCT/CN2014/089829 (14 pages).
PCT International Search Report dated Jan. 28, 2015, issued in related International Application No. PCT/CN2014/089836 (14 pages).
Chinese Search Report dated Nov. 4, 2014, issued in related Chinese Application No. 201410044228.0 (11 pages).
Chinese Search Report dated Nov. 4, 2014, issued in related Chinese Application No. 201410044229.5 (10 pages).
Chinese Search Report dated Nov. 4, 2014, issued in related Chinese Application No. 201410044230.8 (10 pages).
Chinese Search Report dated Nov. 4, 2014, issued in related Chinese Application No. 201410044436.0 (9 pages).
Chinese Search Report dated Nov. 4, 2014, issued in related Chinese Application No. 201410044440.7 (10 pages).
Chinese Search Report dated Nov. 4, 2014, issued in related Chinese Application No. 201410044457.2 (9 pages).
Chinese Search Report dated Nov. 4, 2014, issued in related Chinese Application No. 201410044502.4 (9 pages).
Chinese Search Report dated Nov. 4, 2014, issued in related Chinese Application No. 201410044581.9 (9 pages).
Chinese Search Report dated Nov. 4, 2014, issued in related Chinese Application No. 201410044602.7 (9 pages).
Chinese Search Report dated Nov. 4, 2014, issued in related Chinese Application No. 201410044627.7 (9 pages).
Chinese Search Report dated Nov. 4, 2014, issued in related Chinese Application No. 201410044630.9 (9 pages).
Chinese Search Report dated Nov. 4, 2014, issued in related Chinese Application No. 201410044643.6 (10 pages).
Chinese Search Report dated Nov. 4, 2014, issued in related Chinese Application No. 201410044655.9 (10 pages).
Chinese Search Report dated Nov. 4, 2014, issued in related Chinese Application No. 201410044681.1 (9 pages).
Chinese Search Report dated Nov. 4, 2014, issued in related Chinese Application No. 201410086099.1 (10 pages).
Chinese Search Report dated Nov. 4, 2014, issued in related Chinese Application No. 201410086389.6 (10 pages).
PCT International Search Report and Written Opinion dated Jan. 21, 2015, issued in related International Application No. PCT/CN2014/089821 (11 pages).
PCT International Search Report and Written Opinion dated Jan. 23, 2015, issued in related International Application No. PCT/CN2014/089839 (11 pages).
PCT International Search Report and Written Opinion dated Jan. 26, 2015, issued in related International Application No. PCT/CN2014/089823 (11 pages).
PCT International Search Report and Written Opinion dated Jan. 26, 2015, issued in related International Application No. PCT/CN2014/089824 (11 pages).
PCT International Search Report and Written Opinion dated Jan. 27, 2015, issued in related International Application No. PCT/CN2014/089820 (12 pages).
PCT International Search Report and Written Opinion dated Jan. 28, 2015, issued in related International Application No. PCT/CN2014/089826 (11 pages).

TRANSMISSION UNIT, POWER TRANSMISSION SYSTEM AND VEHICLE COMPRISING THE SAME

CROSS-REFERENCE TO RELATED APPLICATIONS

This application claims priority to and benefits of Chinese Patent Application Nos. 201410460546.5 and 201420518258.6, both filed with the State Intellectual Property Office of P. R. China on Sep. 10, 2014. The entire contents of the above-identified applications are incorporated herein by reference.

FIELD

Embodiments of the present disclosure relate to vehicles, and more particularly to a transmission unit, a power transmission system for a vehicle, and a vehicle including the power transmission system.

BACKGROUND

To reduce energy consumption, the development and utilization of energy-efficient vehicles have become a trend. As an energy-efficient vehicle, a hybrid vehicle is driven by at least one of an international combustion engine and a motor, and has various operation modes, and consequently may operate with improved transmission efficiency and fuel efficiency.

However, in the related art, the power transmission system in the hybrid vehicle is generally complex in structure, provides fewer transmission modes, and is low in transmission efficiency.

SUMMARY

Embodiments of the present disclosure seek to solve at least one of the problems existing in the prior art to at least some extent.

Embodiments of a first broad aspect of the present disclosure provide a transmission unit for a vehicle according to embodiments of the present disclosure includes: a plurality of input shafts, each of the input shafts being provided with a shift driving gear thereon; a plurality of output shafts, each of the output shafts being provided with a shift driven gear configured to mesh with a corresponding shift driving gear; a motor power shaft; a first motor gear freely fitted over the motor power shaft and configured to rotate together with one of the input shafts; a second motor gear freely fitted over the motor power shaft and configured to rotate together with one of the output shafts, and a motor synchronizer disposed on the motor power shaft and between the first and second motor gears.

Embodiments of a second broad aspect of the present disclosure provide a power transmission system for a vehicle. The power transmission system for a vehicle according to embodiments of the present disclosure includes the above-identified transmission unit and a first motor generator configured to rotate together with the motor power shaft.

Embodiments of a third broad aspect of the present disclosure provide a vehicle. The vehicle according to embodiments of the present disclosure includes the above-identified power transmission system for a vehicle.

With the transmission unit, the power transmission system and the vehicle according to embodiments of the present disclosure, the transmission modes are increased.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
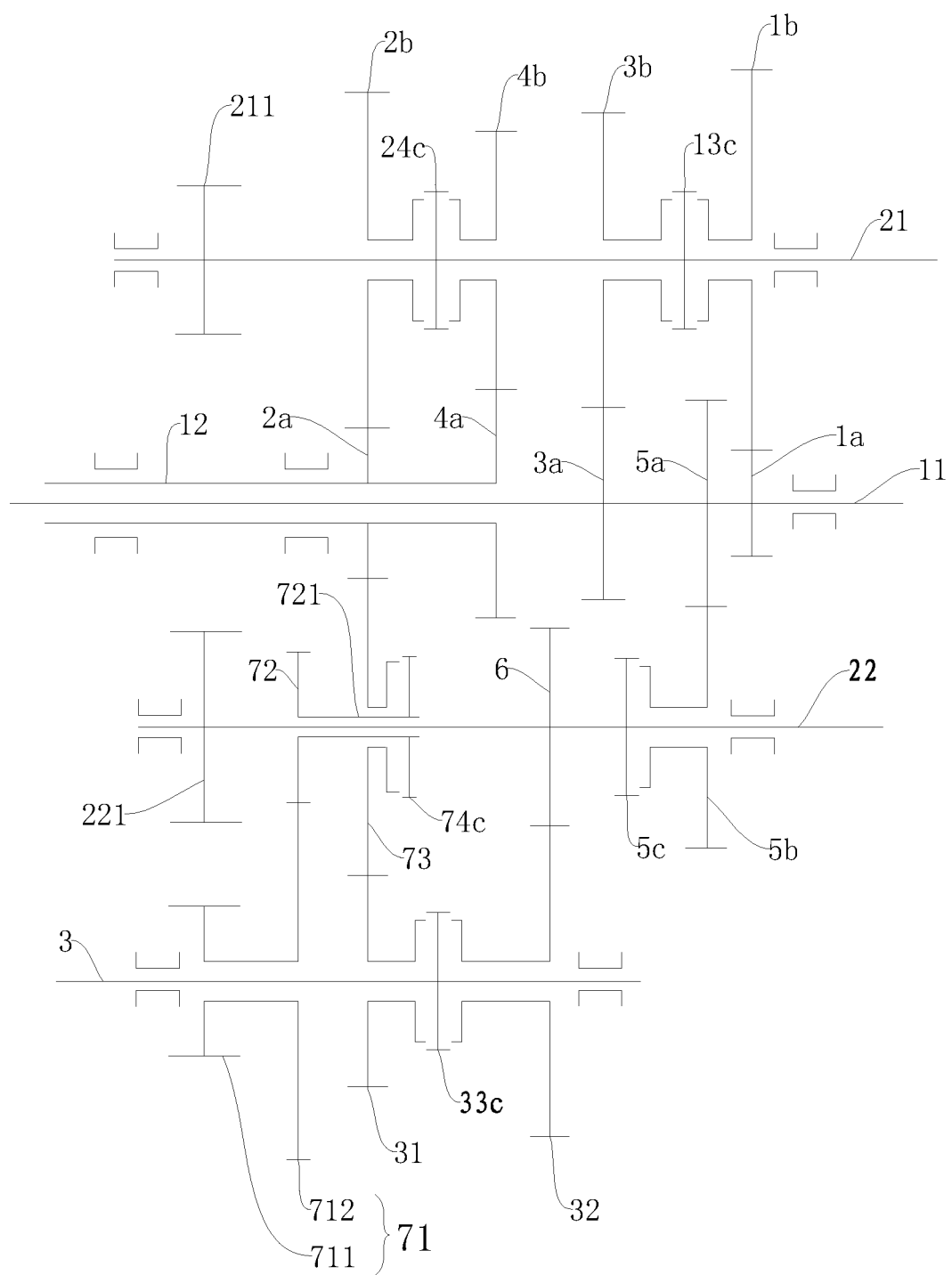
FIG. 1 is a schematic view of an exemplary transmission unit of a power transmission system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A power transmission system according to embodiments of the present disclosure may be described below with reference to FIGS. 1-12. The power transmission system according to embodiments of the present disclosure may be used in vehicles such as hybrid vehicles as a power system, which may provide sufficient power and electric power for driving the vehicle.

In some embodiments, a power transmission system 100 may generally include a power unit and a transmission. The power unit may include an engine 4, a motor generator, and so on. In some embodiments as shown in, for example, FIG. 1, the transmission unit may transmit power output from the power unit, thus driving or charging the vehicle.

In some embodiments, as shown in FIGS. 2-12, the power transmission system 100 may include at least an engine 4, a first motor generator 51, and a transmission unit.

In some embodiments as shown in, for example, FIG. 1, the transmission unit includes a plurality of input shafts (e.g. a first input shaft 11, a second input shaft 12), a plurality of output shafts (e.g. a first output shaft 21, a second output shaft 22), a motor power shaft 3, a plurality of gears provided on related shafts (such as the input shaft, the output shaft, and the motor power shaft), and a gear shift member such as a synchronizer.

In some embodiments, the engine 4 is configured to selectively engage with at least one of the input shafts, when the engine 4 performs power transmission with the input shaft(s). For example, when the engine 4 is transmitting power to the input shaft, the engine 4 may selectively engage with one of the input shafts to transmit power. In some embodiments, the engine 4 may be selectively engage with two or more of the input shafts simultaneously to transmit power.

In some embodiments, as shown in FIGS. 1-12, the plurality of input shafts include a first input shaft 11 and a second input shaft 12. The engine 4 may selectively engage with one of the first and second input shafts 11, 12 to transmit power. In some embodiments, the engine 4 may engage with the first and second input shafts 11, 12 simultaneously to transmit power. It should be noted that, in the present embodiment, the engine 4 may be disengaged from the first and second input shafts 11, 12 simultaneously.

It is known to a person skilled in the art that the engagement between the engine 4 and the input shaft(s) is related to specific conditions of the power transmission system 100. The engagement between the engine 4 and the input shaft(s) will be described below in detail with reference to detailed embodiments.

In some embodiments, the power transmission between the input shaft(s) and the output shaft(s) is achieved by shaft gear pairs. For example, each of the input shafts has a shaft driving gear provided there on, each of the output shafts has a shaft driven gear provided thereon, so that a plurality of gear pairs with different velocity ratio are formed by meshes of corresponding shaft driving gears and shaft driven gears.

In some embodiments, the transmission unit may be a five-speed transmission, i.e. the transmission unit may include a first-gear gear pair, a second-gear gear pair, a third-gear gear pair, a fourth-gear gear pair and a fifth-gear gear pair. There are no particular limits in the present disclosure, a person skilled in the art may increase or reduce the number of gear pairs accordingly based on transmission requirements, and the transmission unit may not be limited to the five-speed transmission as disclosed in the present embodiment.

In some embodiments, as shown in FIGS. 1-12, the motor power shaft 3 is configured to rotate together with one of the input shafts, such as the second input shaft 12. In some embodiments, when power (such as power transmitted to an input shaft from the engine 4) needs to be transmitted to the motor power shaft 3, the motor power shaft 3 rotates together with this input shaft while receiving the power. In some embodiments, when power (such as power transmitted to the motor power shaft 3 from a first motor generator 51) needs to be transmitted to an input shaft, this input shaft rotates together with the motor power shaft 3 while receiving power.

According to embodiments of the present disclosure, the input shaft(s) may rotate together with the motor power shaft 3 when the vehicle including the power transmission system 100 is operated in some specific conditions (will be discussed below with reference to detailed embodiments) in which power needs to be transmitted between the motor power shaft 3 and the input shaft(s).

In some embodiments that a gear rotates together with a shaft, i.e. when the gear rotates, the relative shaft rotates together; alternatively, when the shaft rotates, the relative gear rotates together.

In some embodiments that one shaft rotates together with the other one shaft, i.e. when the one shaft rotates, the other one shaft rotates together.

In some embodiments that one gear rotate together with the other one gear, i.e. when the one gear rotates, the other one gear rotates together.

In the following description, the expression "rotate together with" may be understood as described above, unless specified or limited otherwise.

In some embodiments, the first motor generator 51 may be configured to rotate together with the motor power shaft 3. For example, when functioning as a motor, the first motor generator 51 outputs the power to the motor power shaft 3. In some embodiments, when functioning as a generator, power form the motor power shaft 3 may be transmitted to the first motor generator 51, thereby driving the first motor generator 51 to generate electric power.

In the specification of the present disclosure, a motor generator (such as the first motor generator 51) may be understood as an apparatus which can function as a motor and a generator, unless specified or limited otherwise.

In some embodiments, the motor power shaft 3 may rotate together with one of the input shafts. In some embodiments, when the motor power shaft 3 is rotating together with the one of the input shafts, the first motor generator 51 may use at least a part of power output by the engine 4 to generate electric power when the vehicle is parking or running.

In some embodiments, when the vehicle is operated in a running state and the motor power shaft 3 is rotating together with one of the input shafts, a part of power output by the engine 4 may be transmitted to the first motor generator 51 via the motor power shaft 3, such that the first motor generator 51 is driven to generate electric power, thus accomplishing a condition of charging and driving the vehicle at same time. In some embodiments, when the vehicle is operated in a parking state (the vehicle stops running but the engine is still working) and the motor power shaft 3 is rotating together with one of the input shafts, a part of power output by the engine 4 may be transmitted to the first motor generator 51 via the motor power shaft 3, such that the first motor generator 51 is driven to generate electric power, thus accomplishing a condition of charging the vehicle while parking (such as charging the vehicle while the vehicle is not running).

In some embodiments, the motor power shaft 3 is configured to rotate together with one of the output shafts, such as the second output shaft 22. For example, when power from the motor power shaft 3 needs to be transmitted to the one output shaft, the motor power shaft 3 may rotate together with this output shaft to transmit power. In some embodiments, when the motor power shaft 3 rotates together with one of the output shafts, the first motor generator 51 may generate power and transmit the power to the one output shaft, thereby driving the vehicle to run. In some embodiments, when the motor power shaft 3 rotates together with one output shaft, the first motor generator 51 may output power as a motor to drive the vehicle to run.

In some embodiments, the motor power shaft 3 may be a motor shaft of the first motor generator 51. In some embodiments, the motor power shaft 3 may be a shaft different from the motor shaft of the first motor generator 51.

With the power transmission system 100 according to embodiments of the present disclosure, a number of charging modes of the vehicle are increased. For example, it is possible for charging the vehicle when the vehicle is running and parking. Therefore, deficiencies such like single charging mode and low charging efficiency of a conventional power transmission system may be solved at some extend, in other words, the charging modes of the vehicle are expanded.

The detailed configuration of the transmission unit may be described in detail below with reference to detailed embodiments and FIGS. 1-12.

In the following, a motor synchronizer 33c disposed on the motor power shaft 3, a first motor gear 31 and a second motor gear 32 may be described in detail.

In some embodiments, the first motor gear 31 and the second motor gear 32 may both freely fitted over the motor power shaft 3. The motor power shaft 3 and the first motor gear 31 may rotate with different rotating speeds, and the motor power shaft 3 and the second motor gear 32 may rotate with different rotating speeds.

In some embodiments, as shown in FIGS. 1-12, the first motor gear 31 is configured to rotate together with one of the input shafts, and the second motor gear 32 is configured to rotate together with one of the output shafts. In some embodiments, as shown in FIGS. 1-12, the first motor gear 31 is configured to rotate together with the second input shaft 12, and the second motor gear 32 is configured to rotate together with the second output shaft 22.

In some embodiments, the motor synchronizer 33c is disposed on the motor power shaft 3 and between the first motor gear 31 and the second motor gear 32. The motor synchronizer 33c includes an engaging sleeve which may move along an axial direction of the motor power shaft 3. In some embodiments, as shown in FIGS. 1-12, the engaging sleeve of the motor synchronizer 33c may move leftward or rightward along the axial direction of the motor power shaft 3 under the drive of a shift fork mechanism of the vehicle.

In some embodiments, the motor synchronizer 33c is disposed between the first motor gear 31 and the second motor gear 32, thus the motor synchronizer 33c may selectively engage the motor power shaft 3 with one of the first motor gear 31 and the second motor gear 32.

In some embodiments, as shown in FIGS. 1-12, the engaging sleeve of the motor synchronizer 33c may move leftward to engage the first motor gear 31 with the motor power shaft 3, such that the motor power shaft 3 and the first motor gear 31 may rotate synchronously. In some embodiments, the engaging sleeve of the motor synchronizer 33c may move rightward to engage the second motor gear 32 with the motor power shaft 3, such that the motor power shaft 3 and the second motor gear 32 may rotate synchronously.

In some embodiments, the engaging sleeve of the motor synchronizer 33c may be positioned in a neutral position (such as an initial position). When the engaging sleeve of the motor synchronizer 33c is in the neutral position, the motor synchronizer 33c may be disengaged from the first motor gear 31 and be disengaged from the second motor gear 32.

In some embodiments, a gear ring is disposed on a side of the first motor gear 31 facing the motor synchronizer 33c, and a gear ring is disposed on a side of the second motor gear 32 facing the motor synchronizer 33c, thus facilitating the engagement between the first motor gear 31 and the motor synchronizer 33c and the engagement between the second motor gear 32 and the motor synchronizer 33c.

In some embodiments, the motor power shaft 3 may selectively rotate together with one of the input shafts or may selectively rotate together with one of the output shafts via synchronization of the motor synchronizer 33c, i.e., synchronizing the first motor gear 31 or the synchronizing the second motor gear 32. In an embodiment, the motor synchronizer 33c may synchronize the first motor gear 31, i.e., the motor synchronizer 33c may engage the first motor gear 31 with the motor power shaft 3, and therefore the motor power shaft 3 may rotate together with one of the input shafts, such as the second input shaft 12. In an embodiment, the motor synchronizer 33c may synchronize the second motor gear 32, i.e., the motor synchronizer 33c may engage the second motor gear 32 with the motor power shaft 3, and therefore the motor power shaft 3 may rotate together with one of the output shafts, such as the second output shaft 22.

A reverse unit of the power transmission system 100 according to embodiments of the present disclosure may be described below in detail.

As described in some embodiments, the first motor gear 31 may rotate together with one of the input shafts. In some embodiments, the first motor gear 31 may perform a direct transmission or indirect transmission with the shift driving gear(s) disposed on the one input shaft, thus achieving the object of rotating together with the one input shaft. In some embodiments, as shown in FIGS. 1-12, the first motor gear 31 may perform an indirect transmission with a corresponding shift driving gear (such as a second-gear shift driving gear 2a) via a middle idler 73. In the present embodiment, the middle idler 73 is configured to engage with the corresponding shift driving gear and the first motor gear 31.

In some embodiments, the reverse gear 71 is freely fitted over the motor power shaft 3, the reverse idler gear 72 is configured to mesh with the reverse gear 71 and configured to selectively rotate together with the middle idler 73. In some embodiments, as shown in FIGS. 1-12, the reverse idler gear 72 is freely fitted over the second output shaft 22 and the reverse idler gear 72 and the middle idler 73 can rotate with different rotating speeds. The reverse idler gear 72 may engage with the middle idler 73 to rotate with the middle idler 73 synchronously when it is necessary.

In some embodiments, the middle idler 73 may rotate together with the reverse idler gear 72 via the synchronization of a reverse synchronizer 74c. In the present embodiment, the reverse synchronizer 74c is configured to synchronize the reverse idler gear 72 and the middle idler 73.

In some embodiments, as shown in FIGS. 1-2 and 5-8, the reverse idler gear 72 includes a gear sleeve 721. In some embodiments, the gear sleeve 721 may be freely fitted over the second output shaft 22, and the middle idler 73 may be freely fitted over the gear sleeve 721. The reverse synchronizer 74c may be disposed on the gear sleeve 721 and configured to engage with the middle idler 73.

In some embodiments, the reverse idler gear 72 includes a gear sleeve 721 freely fitted over the second output shaft 22, and the middle idler 73 may be freely fitted over the gear sleeve 721. The reverse synchronizer 74c may be disposed on the middle idler 73 and configured to engage with the gear sleeve 721 or to engage with the reverse idler gear 72.

In some embodiments, as shown in FIGS. 3-4 and 9-12, both the reverse idler gear 72 and the middle idler 73 are freely fitted over one of the output shafts. For example, both the reverse idler gear 72 and the middle idler 73 are freely fitted over the second output shaft 22. The reverse idler gear 72 may be adjacent to the middle idler 73, and the reverse synchronizer 74c may be disposed on the middle idler 73 and configured to engage with the reverse idler gear 72. In some embodiments, the reverse synchronizer 74c may be disposed on the reverse idler gear 72 and configured to engage with the middle idler 73.

In the power transmission system 100 according to embodiments of the present disclosure, the above reverse unit is applied, and therefore a mechanical reverse mode, an electric reverse mode and a hybrid (both mechanic and electric) reverse mode may be achieved.

In the mechanical reverse mode, the reverse of the vehicle is accomplished with power from the engine 4. Specifically, the engine 4 generates power and transmits the power to one of the input shafts, such as the second input shaft 12, to cause the input shaft to rotate together with the middle idler 73. The power is transmitted to the reverse gear 71 via synchronization by the reverse synchronizer 74c (synchronizing the middle idler 73 and the reverse idler gear 72), and then the reverse gear 71 transmits the power to wheels of the vehicle. In this way, reverse-driving of the vehicle can be implemented. In the mechanical reverse mode, the reverse synchronizer 74c may engage the middle idler 73 with the reverse idler gear 72.

In the electric reverse mode, the reverse-driving of the vehicle may be achieved with power from the first motor generator. Specifically, the first motor generator 51 may generate power and transmit the power to the reverse gear 71 via synchronization of the reverse synchronizer 74c (synchronizing the middle idler 73 and the reverse idler gear 72) and a synchronization of the motor synchronizer 33c (synchronizing the first motor gear 31), and then the reverse gear 71 transmits the power to the wheels of the vehicle, thus reversing the vehicle.

In the electric reverse mode, the first motor generator 51 may be operated as a motor and generate power which is to be transmitted to the reverse gear 71 via the motor power shaft 3, the motor synchronizer 33c, the first motor gear 31, the middle idler 73, the reverse synchronizer 74c, and the reverse idler gear 72 sequentially.

In the electric reverse mode, the middle idler 73 and the reverse idler gear 72 may be engaged via the reverse synchronizer 74c, and the motor power shaft 3 and the first motor gear 31 may be engaged via the motor synchronizer 33c.

In the hybrid reverse mode, the reverse of the vehicle may be achieved with the engine 4 and the first motor generator 51. The hybrid reverse mode may be a combination of the above mechanical reverse mode and the electric reverse mode.

In the hybrid reverse mode, the engine unit 4 may generate first power and transmit the first power to one of the input shafts, and then the first power may be transmitted to the reverse gear 71 via synchronization of the reverse synchronizer 74c.

In addition, the first motor generator 51 may generate second power and transmit the second power the reverse gear 71 via the synchronization of the reverse synchronizer 74c and the synchronization of the motor synchronizer 33c (synchronizing the first motor gear 31). In the hybrid reverse mode, both the first power output by the engine 4 and the second power output by the first motor generator may be transmitted to the reverse gear 71 and output from the reverse gear 71.

In the hybrid reverse mode, the middle idler 73 and the reverse idler gear 72 may be engaged by the reverse synchronizer 74c, and the motor power shaft 3 and the first motor gear 31 may be engaged by the motor synchronizer 33c.

As described, with the power transmission system 100 according to embodiments of the present disclosure, three reverse modes including the mechanical reverse mode, the electric reverse mode and the hybrid reverse mode may be achieved, thus increasing the reverse modes and facilitating a user to shift within the three reverse modes according to a practical condition, and therefore different driving requirements may be satisfied.

When the vehicle has sufficient electric power, the electric reverse mode may be used. In the electric reverse mode, harmful exhaust gases can be minimized, and the energy consumption can be reduced. It is known to those skilled in the art that, an unskilled driver will take longer time and more maneuvers to park the vehicle at a predetermined position. Considering that the engine 4 may generate more harmful gases during a low-speed reverse process and that the engine 4 has relatively higher fuel consumption, because the engine is at an uneconomical rotating speed during the reverse process, the electric reverse mode of the present disclosure is highly effective in reducing fuel consumption during such a low-speed reverse process. In addition, with the generator being used as a power source, harmful exhaust gases can be minimized, and the energy consumption in a low-speed reverse process can also be decreased. Therefore, the fuel economy of the engine 4 may be enhanced.

When the vehicle has insufficient or relatively less electric power, the mechanical reverse mode may be used. In a case that the vehicle needs to be reversed quickly or that the vehicle needs to be reversed with a larger power, the hybrid reverse mode may be used, thus enhancing the power of the vehicle and providing better driving experience to the user.

It should be noted that, the above three reverse mode being applied in specific cases may be schematic examples provided for better understanding the present disclosure, which may not be construed that the described reverse mode should be applied when the vehicle is in the corresponding case. It is well known to those skilled in the art that, in a specific condition, a corresponding reverse mode may be selected according to specific requirements and a practical condition.

The power transmission system 100 according to embodiments of the present disclosure may have another electric reverse mode and another hybrid reverse mode, which will be discussed below with reference to detailed embodiments.

The input shaft(s), the output shat(s), the shift driving gears and the shift driven gears of the power transmission system 100 will be described below with reference to embodiments shown in FIGS. 1-12.

In some embodiments, as shown in FIGS. 1-12, two input shafts are provided. In the present embodiment, the plurality of input shafts include a first input shaft 11 and a second input shaft 12. The second input shaft 12 may be hollow and the first input shaft 11 may be solid. One part of the first input shaft 11 may be inserted within the hollow second input shaft 12, and the other part of the first input shaft 11 may extend out of the second input shaft 12 along an axial direction of the second input shaft 12. The first input shaft 11 and the second input shaft 12 may be arranged coaxially.

In some embodiments, two output shafts are provided. In the present embodiment, the plurality of output shafts may include a first output shaft 21 and a second output shaft 22. The first output shaft 21 and the second output shaft 22 may be arranged coaxially with the input shafts (such as the first input shaft 11 and the second input shaft 12). Both the first output shaft 21 and the second output shaft 22 may be solid.

In some embodiments, the power transmission system 100 according to embodiments of the present disclosure may have five gear transmission types. Specifically, odd number-gear shift driving gears may be arranged on the first input shaft 11, while even number-gear shift driving gear may be arranged on the second input shaft 12. The first input shaft 11 may transmit power from gear pairs of odd number-gear, and the second input shaft 12 may transmit power from gear pairs of even number-gear.

In some embodiments, as shown in FIGS. 1-12, a first-gear shift driving gear 1*a*, a third-gear shift driving gear 3*a* and a fifth-gear shift driving gear 5*a* may be arranged on the first input shaft 11, and a second-gear shift driving gear 2*a* and a fourth-gear shift driving gear 4*a* may be arranged on the second input shaft 12. Each of the first-gear to fifth-gear shift driving gears 1*a*, 2*a*, 3*a*, 4*a*, 5*a* may rotate synchronously with a corresponding input shaft.

In some embodiments, a first-gear shift driven gear 1*b*, a second-gear shift driven gear 2*b*, a third-gear shift driven gear 3*b* and a fourth-gear shift driven gear 4*b* may be disposed on the first output shaft 21, and a fifth-gear gear 5*b* may be disposed on the second output shaft 22. Each of the first-gear to fifth-gear shift driven gear 1*b*, 2*b*, 3*b*, 4*b*, 5*b* may be freely fitted over a corresponding output shaft. Each of the shift driven gears and the corresponding output shaft may rotate with different speeds.

In some embodiments, the first-gear shift driving gear 1*a* may mesh with the first-gear shift driven gear 1*b* to form one gear pair, the second-gear shift driving gear 2*a* may mesh with the second-gear shift driven gear 2*b* to form one gear pair, the third-gear shift driving gear 3*a* may mesh with the second-gear shift driven gear 3*b* to form one gear pair, the fourth-gear shift driving gear 4*a* may mesh with the fourth-gear shift driven gear 4*b* to form one gear pair, and the fifth-gear shift driving gear 5*a* may mesh with the fifth-gear shift driven gear 5*b* to form one gear pair, thereby five pairs of gear pairs are formed.

As the shift driven gear is freely fitted over the corresponding output shaft, a synchronizer is provided to synchronize the shift driven gear and the corresponding output shaft, thus achieving the object of power transmission.

In some embodiments, as shown in FIGS. 1-12, the power transmission system 100 includes a first-third gear synchronizer 13*c*, a second-fourth gear synchronizer 24*c* and a fifth gear synchronizer 5*c*.

In some embodiments, as shown in FIGS. 1-12, the first-third gear synchronizer 13*c* is disposed on the first output shaft 21 and between the first-gear shift driven gear 1*b* and the third-gear shift driven gear 3*b*. The first-third gear synchronizer 13*c* may engage the first-gear shift driven gear 1*b* with the first output shaft 21 or engage the third-gear shift driven gear 3*b* with the first output shaft 21, such that the shift driven gear may rotate synchronously with the corresponding output shaft, e.g. the first-gear shift driven gear 1*b* and the first output shaft 21 may rotate synchronously, and the third-gear shift driven gear 3*b* and the first output shaft 21 may rotate synchronously.

In some embodiments, as shown in FIGS. 1-12, the first-third gear synchronizer 13*c* includes an engaging sleeve. In some embodiments, the engaging sleeve of the first-third gear synchronizer 13*c* may move leftward to engage the third-gear shift driven gear 3*b* with the first output shaft 21, such that the third-gear shift driven gear 3*b* and the first output shaft 21 may rotate synchronously. In some embodiments, the engaging sleeve of the first-third gear synchronizer 13*c* may move rightward to engage first-gear shift driven gear 1*b* with the first output shaft 21, such that the first-gear shift driven gear 1*b* and the first output shaft 21 may rotate synchronously.

In some embodiments, as shown in FIGS. 1-12, the second-fourth gear synchronizer 24*c* is disposed on the first output shaft 21 and between the second-gear shift driven gear 2*b* and the fourth-gear shift driven gear 4*b*. The second-fourth gear synchronizer 24*c* may engage the second-gear shift driven gear 2*b* with the first output shaft 21 or engage the fourth-gear shift driven gear 4*b* with the first output shaft 21, such that the shift driven gear may rotate synchronously with the corresponding output shaft. For example, the second-gear shift driven gear 2*b* and the first output shaft 21 may rotate synchronously, and the fourth-gear shift driven gear 4*b* and the first output shaft 21 may rotate synchronously.

In some embodiments, as shown in FIGS. 1-12, the second-fourth gear synchronizer 24c includes an engaging sleeve. In some embodiments, the engaging sleeve of the second-fourth gear synchronizer 24c may move leftward to engage the second-gear shift driven gear 2b with the first output shaft 21, such that the second-gear shift driven gear 2b and the first output shaft 21 may rotate synchronously. In some embodiments, the engaging sleeve of the second-fourth gear synchronizer 24c may move rightward to engage fourth-gear shift driven gear 4b with the first output shaft 21, such that the fourth-gear shift driven gear 4b and the first output shaft 21 may rotate synchronously.

In some embodiments, as shown in FIGS. 1-12, the fifth gear synchronizer 5c is disposed on the second output shaft 22 and located on a side, such as left side, of the fifth-gear shift driven gear 5b. The fifth gear synchronizer 5c may engage the fifth-gear shift driven gear 5b with the second output shaft 22. In some embodiments, the fifth gear synchronizer 5c includes an engaging sleeve, the engaging sleeve of the fifth gear synchronizer 5c may move rightward to engage the fifth-gear shift driven gear 5b with the second output shaft 22, such that the fifth-gear shift driven gear 5b and the second output shaft 22 may rotate synchronously.

In some embodiments, as shown in FIGS. 1-12, the reverse idler gear 72, the middle idler 73 are positioned on the second output shaft 22, the fifth-gear shift driven gear 5b is positioned on the second output shaft 22 and configured to solely engage the fifth-gear shift driven gear 5b with the second output shaft 22, and the reverse synchronizer 74c is configured to merely engage the middle idler 73 and the reverse idler gear 72. In some embodiments, the reverse synchronizer 74c and the fifth gear synchronizer 5c may share a shift fork mechanism. Therefore, one shift fork mechanism is sufficient for the present disclosure, instead of tow shift fork mechanisms, i.e. one shift fork mechanism is saved, thus the structure of the power transmission system 100 can be more compact.

In some embodiments, the shift fork mechanism may drive the engaging sleeve of the fifth gear synchronizer 5c and the engaging sleeve of the reverse synchronizer 74c. In some embodiments, as shown in FIG. 1, when the shift fork mechanism drives the engaging sleeve of the fifth gear synchronizer 5c to move rightward, the fifth gear synchronizer 5c may engage the fifth-gear shift driven gear 5b with the second output shaft 22, but the reverse idler gear 72 and the middle idler 73 are not engaged by the fifth gear synchronizer 5c. In some embodiments, when the shift fork mechanism drives the engaging sleeve of the reverse synchronizer 74c to engage the reverse idler gear 72 with the middle idler 73, the fifth-gear shift driven gear 5b and the second output shaft 22 are not engaged by the fifth gear synchronizer 5c. The engaging sleeve of the reverse synchronizer 74c and the engaging sleeve of the fifth gear synchronizer 5c are provided in the present embodiment for better understanding of the present disclosure, and therefore may not be construed as a limit to the present disclosure.

In some embodiments of the present disclosure, the engine 4 may transmit power with the first input shaft 11 and the second input shaft 12 via a dual clutch 2d, or the engine 4 may disengage from the first input shaft 11 and the second input shaft 12 via a dual clutch 2d.

In some embodiments of the present disclosure, as shown in FIGS. 2-12, the dual clutch 2d includes an input terminal 23d, a first output terminal 21d and a second output terminal 22d. The engine 4 is connected with the input terminal 23d of the dual clutch 2d. In some embodiments, the engine 4 is connected with the input terminal 23d by at least one selected from a group consisting of a flywheel, a damper, a torsional disk, etc.

In some embodiments, the first output terminal 21d is connected with the first input shaft 11, such that the first output terminal 21d and the first input shaft 11 may rotate synchronously. In some embodiments, the second output terminal 22d is connected with the second input shaft 12, such that the second output terminal 22d and the second input shaft 12 may rotate synchronously.

In some embodiments, the input terminal 23d may include a shell of the dual clutch 2d, and each of the first output terminal 21d and the second output terminal 22d may include one driven disk of the dual clutch 2d. In some embodiments, the shell is disengaged from the driven disk, i.e. the input terminal 23d is disengaged from the first output terminal 21d and is disengaged from the second output terminal 22d. When the shell is to engage with one driven disk, the shell is controlled to engage with a corresponding driven disk, thus the shell and this driven disk may rotate synchronously. In the present embodiment, the input terminal 23d may engage with one of the first output terminal 21d and the second output terminal 22d, thus transmitting power from the input terminal 23d to one of the first output terminal 21d and the second output terminal 22d to output the power.

In some embodiments, the shell may engage with two driven disks simultaneously. In the present embodiment, the input terminal 23d is engaged with both the first output terminal 21d and the second output terminal 22d, and thereby power from the input terminal 23d may be transmitted to the first output terminal 21d and the second output terminal 22d to be output.

Those with ordinary skill in the art will appreciate that, the engaging state of the dual clutch 2d may be controlled according to practical condition, and may be adjusted accordingly based on a current transmission mode. In some embodiments, the input terminal 23d may be disengaged from the two output terminals, for example, the first output terminal 21d and the second output terminal 22d. In some embodiments, the input terminal 23d may engage with at least one of the two output terminals, for example, the first output terminal 21d and the second output terminal 22d.

In some embodiments, the second motor gear 32 may rotate together with one of the output shafts. In some embodiments, a transmission gear 6 is fixed on the second output shaft 22 and configured to directly mesh with the second motor gear 32. As described above, the power transmission system 100 according to embodiments of the present disclosure may have another electric reverse mode and another hybrid reverse mode. In some embodiments, the second motor gear 32 may mesh with the transmission gear 6 fixed on the second output shaft 22 to form a power transmission passage, and thereby power from the first motor generator 51 may be transmitted via this power transmission passage. In this way, another reverse mode may be achieved.

In the another electric reverse mode, the first motor generator 51 may output power and transmit the power to the second output shaft 22 via the synchronization of the motor synchronizer 33c (for example, synchronizing the second motor gear 32), and then the second output shaft 22 output the power to wheels of the vehicle, thus reversing the vehicle.

In the present embodiment, the first motor generator 51 is operated as a motor and generates power which is transmitted to the wheels of the vehicle via the motor power shaft 3, the motor synchronizer, the second motor gear 32, the transmission gear, and the second output shaft 22 sequentially.

In the another electric reverse mode, the motor synchronizer 33c may engage the motor power shaft 3 with the second motor gear 32, while the reverse synchronizer 74c does not engage the middle idler 73 and the reverse idler gear 72, and power for reversing the vehicle may not be output from the reverse gear 71.

In the another hybrid reverse mode, the engine 4 may generate first power and transmit the first power to one of the input shafts, and then the power is transmitted to the reverse gear 71 via synchronization of the reverse synchronizer 74c.

In the another hybrid reverse mode, the first motor generator 51 may generate second power and transmit the second power to the second output shaft 22 via synchronization of the motor synchronizer 33c (synchronizing the second motor gear 32 and the second output shaft 22), and then the second output shaft 22 may transmit the second power to the wheels to reverse the vehicle.

In the another hybrid reverse mode, the vehicle is reversed by powers from both the engine 4 and the first motor generator 51, i.e. the first power and the second power. The first power and the second power may be coupled before output to the wheels. In some embodiments, the first power and the second power may be coupled at a shift driven gear 74 of a main reducer of the vehicle, and the coupled power may be transmitted to the wheels to reverse the vehicle.

In the another hybrid reverse mode, the reverse synchronizer 74c engages the middle idler 73 and the reverse idler gear 72, the motor synchronizer 33c engages the motor power shaft 3 with the second motor gear 32, and a part of power for reversing the vehicle may be output from the reverse gear 71, and the other part of power for reversing the vehicle may be output from the second output shaft 22.

In the another electric reverse mode, power for reversing the vehicle may be from the first motor generator 51, which is similar as that in the aforementioned electric reverse mode. In comparison with the aforementioned electric reverse mode in which power generated by the first motor generator 51 is transmitted to the reverse gear 71 and then to wheels of the vehicle to reverse the vehicle, in the another electric reverse mode power generated by the first motor generator 51 is output to the wheels via the second output shaft 22. In the another electric reverse mode, power for reversing the vehicle does not pass the reverse gear 71.

In the another hybrid reverse mode, the transmission passage of power from the engine 4 and the transmission passage of power from the first motor generator 51 are combined, which is similar to that in the aforementioned hybrid reverse mode. The differences between the another hybrid reverse mode and the aforementioned hybrid reverse mode are similar to those between the another electric reverse mode and the aforementioned electric reverse mode described above, thus details thereof are omitted herein.

With the power transmission system 100 according to embodiments of the present disclosure, a number of the reverse modes of the vehicle are increased, which may provide a driver more options to reverse the vehicle. In this way, the driver may be provided more driving fun and reverse of the vehicle in different road conditions may be satisfied.

In some embodiments, the power transmission system 100 includes three power output shafts, i.e. a first output shaft 21, a second output shaft 22, and a motor power shaft 3. These power output shafts, a differential 75, and relationships therebetween may be described below in detail with reference to FIGS. 2-12.

In some embodiments, the differential 75 may be disposed between a pair of front wheels of the vehicle. In some embodiments, the differential 75 may be disposed between a pair of rear wheels of the vehicle. The differential 75 may allow the left and right driving wheels to roll with different angular speeds when the vehicle is turning or running on a rough road, and therefore the left and right driving wheels of the vehicle may perform pure rolling motions on the ground. In some embodiments, a shift driven gear 74 of a main reducer may be disposed on the differential 75, for example, the shift driven gear 74 may be disposed on a shell of the differential 75. In some embodiments, the shift driven gear 74 may be a bevel gear, without particular limits in the present disclosure.

In some embodiments, a first shift driven gear 211 is fixed on the first output shaft 21 and configured to rotate with the first output shaft 21 synchronously. The first shift driven gear 211 may mesh with the shift driven gear 74, thus transmitting power transmitted to the first output shaft 21 from the first output gear 211 to the shift driven gear 74 and the differential 75.

In some embodiments, a second shift driven gear 221 is fixed on the second output shaft 22 and configured to rotate with the second output shaft 22 synchronously. The second shift driven gear 221 may mesh with the shift driven gear 74, thus transmitting power transmitted to the second output shaft 22 from the second output gear 221 to the shift driven gear 74 and the differential 75.

As described in some embodiments, the reverse gear 71 is used as the power output terminal in most reverse modes and is configured to mesh with the shift driven gear 74. As the reverse gear 71 is further configured to mesh with the reverse idler gear 72, in some embodiments, the reverse gear 71 may be a duplex gear, and therefore proper reverse speed ratio may be obtained. In the present embodiment, the reverse gear 71 is a duplex gear, a part of the reverse gear 71 may mesh with the reverse idler gear 72, and another part of the reverse gear 71 may mesh with the shift driven gear 74. In the present embodiment, the reverse gear 71 includes a first gear part 711 to mesh with the shift driven gear 74 and a second gear part 712 to mesh with the reverse idler gear 72. With the reverse gear 71 described above, a better reverse speed ratio may be obtained, while various gears may not interfered during the power transmission of the reverse process. In this way, a reliable power transmission may be ensured during the reverse process.

The power transmission system 100 according to embodiments of the present disclosure may be used in various different conditions, such as a parking-charging condition (for example, charging the vehicle while the vehicle is parking), a running-charging condition (for example, charging the vehicle while the vehicle is running and both clutch parts of the dual clutch 2d are engaged), a speed adjusting condition.

In the parking-charging condition, the engine 4 is configured to generate power and output the power to one of the input shafts, for example, an input shaft rotating together with the first motor gear 31, such as the second input shaft 12, and the motor synchronizer 33c synchronizes the first motor gear 31 and the input shaft such as the second input shaft 12 to transmit the power to the first motor generator 51, thereby driving the first motor generator 51 to generate electric power.

In some embodiments, as shown in FIGS. 2-12, in the parking-charging state, the engine 4 generates power and transmits the power to the second input shaft 12 via the dual clutch 2d. As the second input shaft 12 rotates together with the first motor gear 31, the motor synchronizer 33c may engage the motor power shaft 3 and the first motor gear 31, and therefore the power generated by the engine 4 may be transmitted to the motor power shaft 3 via the second input shaft 12, the middle idler 73, the first motor gear 31, and the motor synchronizer 33c sequentially. Then the motor power shaft 3 may transmit the power to the first motor generator 51, and the first motor generator 51 may be driven to generate electric power as a generator.

Therefore, charging the vehicle when the vehicle is parking may be achieved, and the number of the charging modes is increased. In the parking-charging mode, the vehicle is not running, all power from the engine 4 may be used to charge the vehicle, thus providing a fast charging performance and enhancing the charging efficiency.

In the running-charging condition, the input terminal 23d is engaged with the first output terminal 21d and engaged with the second output terminal 22d simultaneously, a part of power generated by the engine 4 may be output to one of the output shafts to drive the wheels of the vehicle, and the other part of power may be transmitted to the first motor generator 51 via the motor power shaft 3, thus driving the first motor generator 51 to generate electric power.

In the running-charging condition, as shown in FIGS. 2-12, a part of power generated by the engine 4 may be output from the first output shaft 21 or the second output shaft 22, such as via the first-gear gear pair, the third-gear gear pair or the fifth-gear gear pair. The other part of power generated by the engine 4 may be transmitted to the first motor generator 51 via the first motor gear 31, the motor synchronizer 33c, the motor power shaft 3 sequentially, thus driving the first motor generator 51 to generate electric power.

It is known to those skilled in the art that, a conventional dual clutch generally have two gear parts, and only one gear part is used when the dual clutch is working. In the power transmission system 100 according to embodiments of the present disclosure, however, two gears parts of the dual clutch 2d may be both engaged (for example, the input terminal 23d is engaged with the first output terminal 21d and engaged with the second output terminal 22d simultaneously) when the dual clutch 2d is working. In the present embodiment, a part of power from the engine 4 may be output to wheels of the vehicle via one output shaft to drive the vehicle to run, and the other part of power from the engine 4 may be transmitted to the first motor generator 51 to drive the first motor generator 51 to generate electric power. In this way, transmission modes of the vehicle are increased, and charging the vehicle while the vehicle is running may be achieved.

In the speed adjusting condition, as shown in FIGS. 2-12, the motor synchronizer 33c is disposed between the first motor gear 31 and the second motor gear 32, and therefore power generated by the first motor generator 51 may be selectively output via the first motor gear 31 or the second motor gear 32. The vehicle switches from outputting power via the first motor gear 31 to outputting power via the second motor gear 32 by the synchronization of the motor synchronizer 33c.

The Applicants have found that, when the vehicle switches from outputting power via the first motor gear to outputting power via the second motor gear, the engaging sleeve of the synchronizer can move from an engaging position at the first motor gear to an engaging position at the second motor gear. As a speed ratio of a transmission passage from the first motor gear 31 to the shift driven gear 74 can be different from that of a transmission passage from the second motor gear 32 to the shift driven gear 74, the second motor gear 32 and the motor power shaft 3 may rotate at different rotating speeds during the switching process. In this way, the synchronization time and wear of the synchronizer may be increased, and therefore the transmission efficiency may be reduced. Further, an unsmooth traveling of the vehicle caused by power interruption or power stop may occur because the synchronization cannot be completed during a long term.

In some embodiments, the first motor generator 51 is controlled to adjust the rotating speed of the motor power shaft 3 based on the rotating speed of the second motor gear 32. In the present embodiment, the rotating speed of the motor power shaft 3 may be increased or decreased with the rotating speed of the second motor gear 32 as a target speed, and therefore the rotating speed of the motor power shaft 3 may be matched with the rotating speed of the second motor gear 32 during a shorter time, for example, the rotating speed of the motor power shaft 3 is equal to or substantially equal to the rotating speed of the second motor gear 32. In this way, the motor synchronizer 33c may engage the second motor gear 32 with the motor power shaft 3 rapidly, and therefore the synchronization time of the motor synchronizer 33c may be reduced and the transmission efficiency, the synchronization controllability and the synchronization real-time capability may be improved. In addition, the life of the motor synchronizer 33c may be prolonged and the maintenance cost of the vehicle may be reduced.

In some embodiments, when the vehicle switches from outputting power from the second motor gear 32 to outputting power form the first motor gear 31, the first motor generator 51 may adjust the rotating speed of the motor power shaft 3 based on the rotating speed of the first motor gear 31. In the present embodiment, the first motor generator 51 may increase or decrease the rotating speed of the motor power shaft 3 with the rotating speed of the first motor gear 31 as a target speed, such that the rotating speed of the motor power shaft 3 may be matched with the rotating speed of the first motor gear 31 in a shortest time, thus enhancing the engaging efficiency of the motor synchronizer 33c.

In the present embodiment, during the period that the motor synchronizer 33c switches from engaging with one of the first motor gear 31 and the second motor gear 32 to engaging with the other one of the first motor gear 31 and the second motor gear 32, the first motor generator 51 may adjust the rotating speed of the motor power shaft 3 with the rotating speed of the other one of the first motor gear 31 and the second motor gear 32 as a target speed.

In the speed adjusting condition, the vehicle may run in an electric mode, i.e. the vehicle is driven by the first motor generator 51. The present disclosure, however, is not limited to this embodiment. For other modes, such as an electric-mechanic hybrid mode, in which the motor synchronizer 33c may be switched from engaging with one of the first motor gear 31 and the second motor gear 32 to engaging with the other one of the first motor gear 31 and the second motor gear 32, the rotating speed of the motor power shaft 3 may be adjusted by the first motor generator 51.

With the power transmission system 100 according to embodiments of the present disclosure, during the period that the motor synchronizer 33c switches from engaging with one of the first motor gear 31 and the second motor gear 32 to engaging with the other one of the first motor gear 31 and the second motor gear 32, the first motor generator 51 may adjust the rotating speed of the motor power shaft 3, such that the rotating speed of the motor power shaft 3 may be matched with the rotating speed of the gear to be engaged, for example, the first motor gear 31 or the second motor gear 32. The first motor generator 51 may adjust the rotating speed of the motor power shaft 3 with the rotating speed of the gear to be engaged as a target speed, such that the rotating speed of the motor power shaft 3 may be matched with the rotating speed of the gear to be engaged in a shortest time, thus facilitating the engagement of the motor synchronizer 33c, significantly improving the transmission efficiency and reducing the transmission loss.

In some embodiments, the power transmission system 100 further includes a second motor generator 52. With the second motor generator 52, the power of the power transmission system 100 may be improved and transmission modes may be increased.

In some embodiments, the second motor generator 52 may perform power transmission with the shift driven gear 74 of the main reducer. For example, a gear may be disposed on a motor shaft of the second motor generator 52, and the gear is configured to directly mesh with the shift driven gear 74 to perform power transmission. In some embodiments, the second motor generator 52 is configured to connect with the first input shaft 11 or the first output shaft 21. In some embodiments, the second motor generator 52 may be integral with the differential 75. In some embodiments, the engine 4 and the first motor generator 51 are configured to drive front wheels of the vehicle, and the second motor generator 52 may be a wheel-side motor and configured to drive rear wheels. In some embodiments, the second motor generator 52 may drive the pair of rear wheels via a reducing mechanism. In some embodiments, two second motor generators 52 are provided, and each second motor generator 52 is configured to driven one rear wheel via a reducing mechanism.

In some embodiments, the power transmission system 100 may include an electric differential lock unit. The electric differential lock unit may lock a pair of driving wheels when the vehicle is skidding, thus enhancing the antiskid performance and the trafficability performance of the vehicle.

In some embodiments, as shown in FIGS. 5-12, the electric differential lock unit may include a third motor generator 201, a fourth motor generator 301 and an antiskid synchronizer 503. The engine 4 and/or the first motor generator 51 is configured to drive a first pair of wheels 76, the third motor generator 201 and the fourth motor generator 301 are configured to driven a second pair of wheels 77, the first pair of wheels 76 are one pair of the pair of front wheels and the pair of the rear wheels, and the second pair of wheels 77 are the other one pair of the pair of front wheels and the pair of the rear wheels. In some embodiments, as shown in FIGS. 5-12, the engine and the first motor generator 51 may drive the pair of front wheels, and the third motor generator 201 and the fourth motor generator 301 may drive the pair of rear wheels.

In some embodiments, as shown in FIGS. 5-12, the third motor generator 201 is configured to rotate together with one of the second pair of wheels 77. In the present embodiment, the third motor generator 201 may output power to this one wheel to drive this one wheel to rotate. In some embodiments, power from this one wheel may be transmitted to the third motor generator 201, thus driving the third motor generator 201 to generate electric power.

In some embodiments, the fourth motor generator 301 is configured to rotate together with the other one of the second pair of wheels 77. In the present embodiment, the fourth motor generator 301 may output power to the other one wheel to drive the other wheel to rotate. In some embodiments, power form the other wheel may be transmitted to the fourth motor generator 301, thus driving the fourth motor generator 301 to generate electric power. In some embodiments, as shown in FIGS. 5-12, the third motor generator 201 is configured to rotate together with a left rear wheel of the vehicle, and the fourth motor generator 301 is configured to rotate together with a right rear wheel of the vehicle. This embodiment is provided for example, and the present disclosure should not be construed to be limited by this embodiment.

In some embodiments, the antiskid synchronizer 503 is configured to selectively synchronize the second pair of wheels 77, such that the second pair of wheels 77 may rotate synchronously. In the present embodiment, the antiskid synchronizer 503 may synchronize the second pair of wheels 77, i.e. the antiskid synchronizer 503 is in an engaged state, such that the second pair of wheels 77 may form a fixed engagement. In this way, the second pair of wheels 77 may rotate synchronously, without rotating at different rotating speeds.

In some embodiments, when the antiskid synchronizer 503 is in a disengaged state, and the third motor generator 201 and the fourth motor generator 301 may drive corresponding wheels respectively, such that the corresponding wheels may rotate at different rotating speeds, thus the object that different wheels rotates at different speeds may be achieved. In some embodiments, when the antiskid synchronizer 503 is in a disengaged state, the third motor generator 201 and the fourth motor generator 301 may drive the second pair of wheels 77 to rotate at a same rotating speed.

With the power transmission system 100 according to embodiments of the present disclosure, the third motor generator 201 and the fourth motor generator 301 are provided and configured to drive the second pair of wheels 77 respectively, and therefore having the second pair of wheels 77 rotating at different rotating speeds may be achieved.

When one of the second pair of wheels 77 is skidding, the antiskid synchronizer 503 may synchronize the second pair of wheels 77 such that the second pair of wheels 77 rotate synchronously. In this way, powers output by two motors (for example, the third motor generator 201 and the fourth motor generator 301) or one motor (for example, one of the third motor generator 201 and the fourth motor generator 301) may be coupled to drive the second pair of wheels 77 together, thus enhancing the antiskid capability and trafficability performance of the vehicle.

The power transmission system 100 according to embodiments of the present disclosure includes the antiskid synchronizer 503, and therefore a mechanical self-locking differential mechanism commonly used in an axle (such as a rear axle) a conventional power transmission system may be avoided. In addition to the functions of the antiskid synchronizer 503 itself, the functions of a mechanical self-locking differential mechanism are performed by the antiskid synchronizer 503, and therefore the power transmission system 100 according to embodiments of the present disclosure may have a more compact structure and relatively lower cost.

The third motor generator 201, the fourth motor generator 301, and transmission method thereof will be described below in detail with references to FIGS. 5-12.

In some embodiments, as shown in FIGS. 5-7 and 9-11, the third motor generator 201 may perform power transmission with the corresponding wheel via a gear mechanism. In some embodiments, the fourth motor generator 301 may perform power transmission with the corresponding wheel via a gear mechanism.

The gear mechanism has simple structure and is convenient for use in power transmission. In addition, with the gear mechanism, a desired transmission ration may be obtained and the power transmission may be reliable. In some embodiments, the third motor generator 201 and the fourth motor generator 301 may perform power transmission with corresponding wheel(s) via a same gear mechanism. In the present embodiment, the gear mechanism is common, and the power transmission system 100 may be highly symmetric, thus avoiding the center of gravity moving to one side. With one common gear mechanism, the center of gravity may be located right in the middle or substantially the middle of the two wheels, and both the stability and reliability of the power transmission system 100 may be improved.

In some embodiments, as shown in FIGS. 5-7 and 9-11, the gear mechanism between the third motor generator 201 and the corresponding wheel may include a first gear 401, a second gear 402, a third gear 403, and a fourth gear 404.

In some embodiments, the first gear 401 may be disposed on the first output shaft 202 corresponding to the third motor generator 201, and the first gear 401 is configured to rotate synchronously with the first output shaft 202. In some embodiments, the first output shaft 202 may output power generated by the third motor generator 201. In some embodiments, the first output shaft 202 may transmit power generated by the corresponding wheel to the third motor generator 201. In some embodiments, the first output shaft 202 and the third motor generator 201 may share a same motor shaft. In some embodiments, the motor shaft of the first output shaft 202 and the motor shaft the third motor generator 201 may be two individual parts different from each other. In the present embodiment, the motor shaft of the first output shaft 202 and the motor shaft the third motor generator 201 may be connected to each other.

In some embodiments, a first drive shaft 204 is connected with a wheel corresponding to the third motor generator 201, and the second gear 402 is disposed on the first drive shaft 204 and configured to rotate synchronously with the first drive shaft 204. The third gear 403 and the first gear 401 are configured to mesh with each other, and the fourth gear 404 and the second gear 402 are configured to mesh with each other. The third gear 403 and the fourth gear 404 are coaxially arranged and may rotate synchronously.

In some embodiments, as shown in FIGS. 5-7 and 9-11, the gear mechanism between the fourth motor generator 301 and the corresponding wheel may include a fifth gear 405, a sixth gear 406, a seventh gear 407, and an eighth gear 408.

In some embodiments, the fifth gear 405 may be disposed on the second output shaft 302 corresponding to the fourth motor generator 301, and the fifth gear 405 is configured to rotate synchronously with the second output shaft 302. In some embodiments, the second output shaft 302 may output power generated by the fourth motor generator 301. In some embodiments, the second output shaft 302 may transmit power generated by the corresponding wheel to the fourth motor generator 301. In some embodiments, the second output shaft 302 and the fourth motor generator 301 may share a same motor shaft. In some embodiments, the motor shaft of the second output shaft 302 and the motor shaft the fourth motor generator 301 may be two individual parts different from each other. In the present embodiment, the motor shaft of the second output shaft 302 and the motor shaft the fourth motor generator 301 may be connected to each other.

In some embodiments, a second drive shaft 304 is connected with a wheel corresponding to the fourth motor generator 301, and the sixth gear 406 is disposed on the second drive shaft 304 and configured to rotate synchronously with the second drive shaft 304. The seventh gear 407 and the fifth gear 405 are configured to mesh with each other, and the eighth gear 408 and the sixth gear 406 are configured to mesh with each other. The seventh gear 407 and the eighth gear 408 are coaxially arranged and may rotate synchronously.

In some embodiments, the first gear 401 and the fifth gear 405 may have a same structure, such as having a same size and a same teeth number. In some embodiments, the second gear 402 and the sixth gear 406 may have the same structure, such as having a same size and a same teeth number. In some embodiments, the third gear 403 and the seventh gear 407 may have the same structure, such as having a same size and a same teeth number. In some embodiments, the fourth gear 404 and the eighth gear 408 may have the same structure, such as having a same size and a same teeth number. Therefore, versatility of the gear mechanism may be improved.

In some embodiments, the third gear 403 and the fourth gear 404 may be fixed on the first gear shaft 501, and the seventh gear 407 and the eighth gear 408 may be fixed on the second gear shaft 502. In some embodiments, the third gear 403 and the fourth gear 404 may form a substantial ladder shape or a joint gear structure. In some embodiments, the seventh gear 407 and the eighth gear 408 may form a substantial ladder shape or a joint gear structure.

Figure 5:
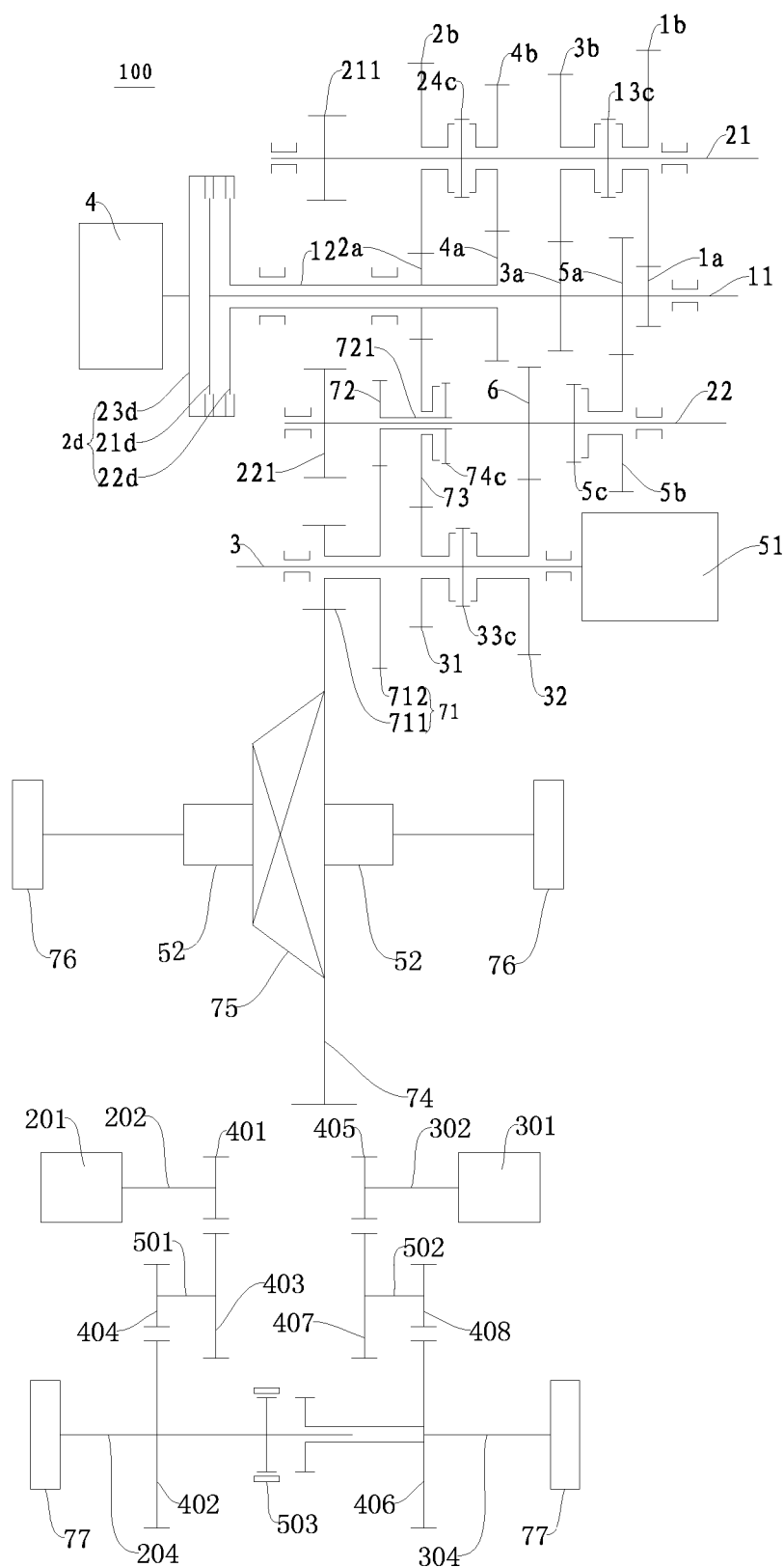
FIG. 5 is a schematic view of an exemplary power transmission system according to an embodiment of the present disclosure.
Figure 9:
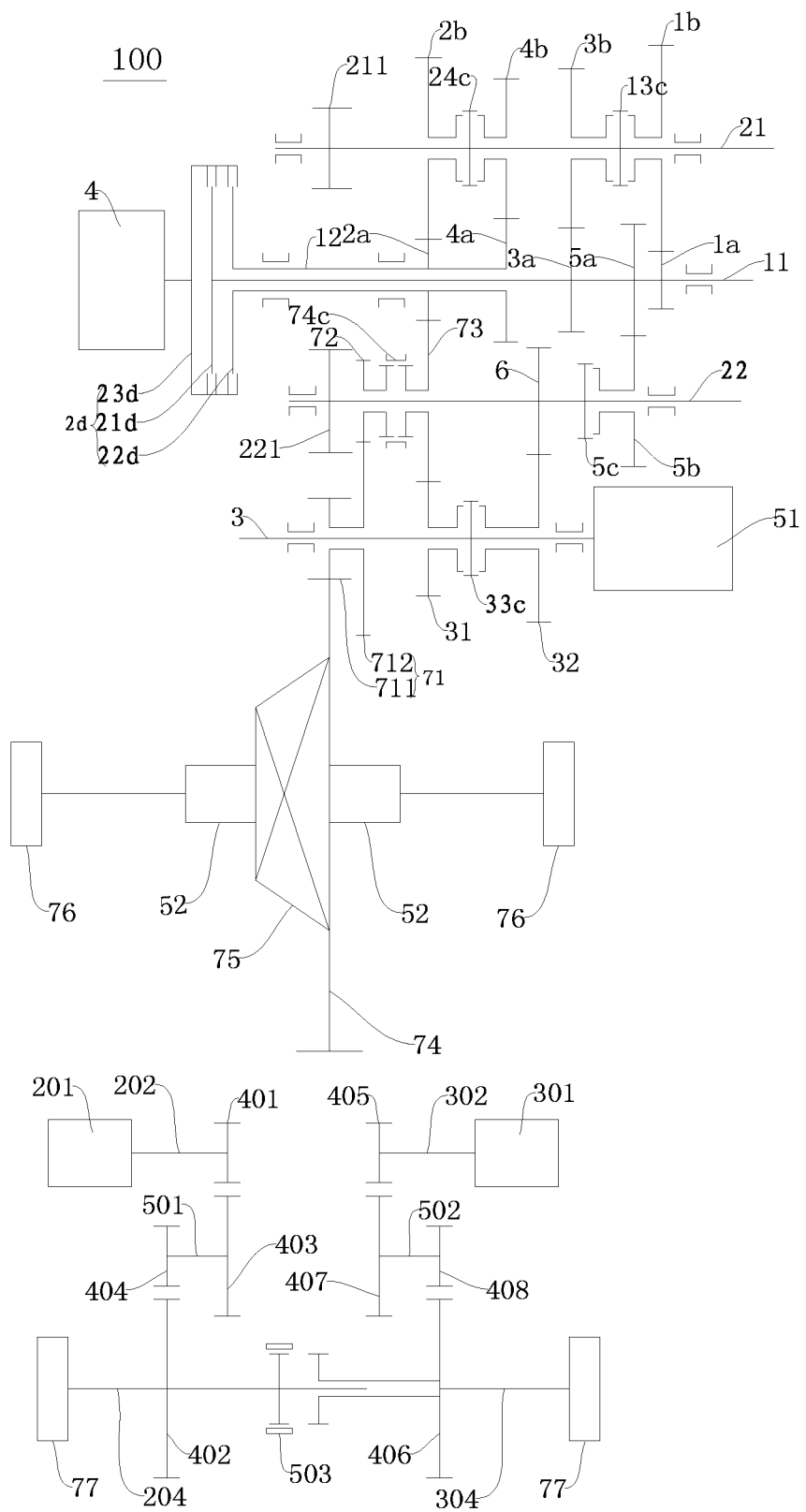
FIG. 9 is a schematic view of an exemplary power transmission system according to an embodiment of the present disclosure.

In some embodiments, as shown in FIGS. 5 and 9, the antiskid synchronizer 503 may be disposed on the first drive shaft 204 and configured to selectively engage with the sixth gear 406. In some embodiments, a gear ring may be provided on a side of the sixth gear 406 facing the antiskid synchronizer 503, and the antiskid synchronizer 503 may include an engaging sleeve to adapt to the gear ring. With the engagement of the antiskid synchronizer 503, the second pair of wheels 77 may rotate synchronously.

Figure 6:
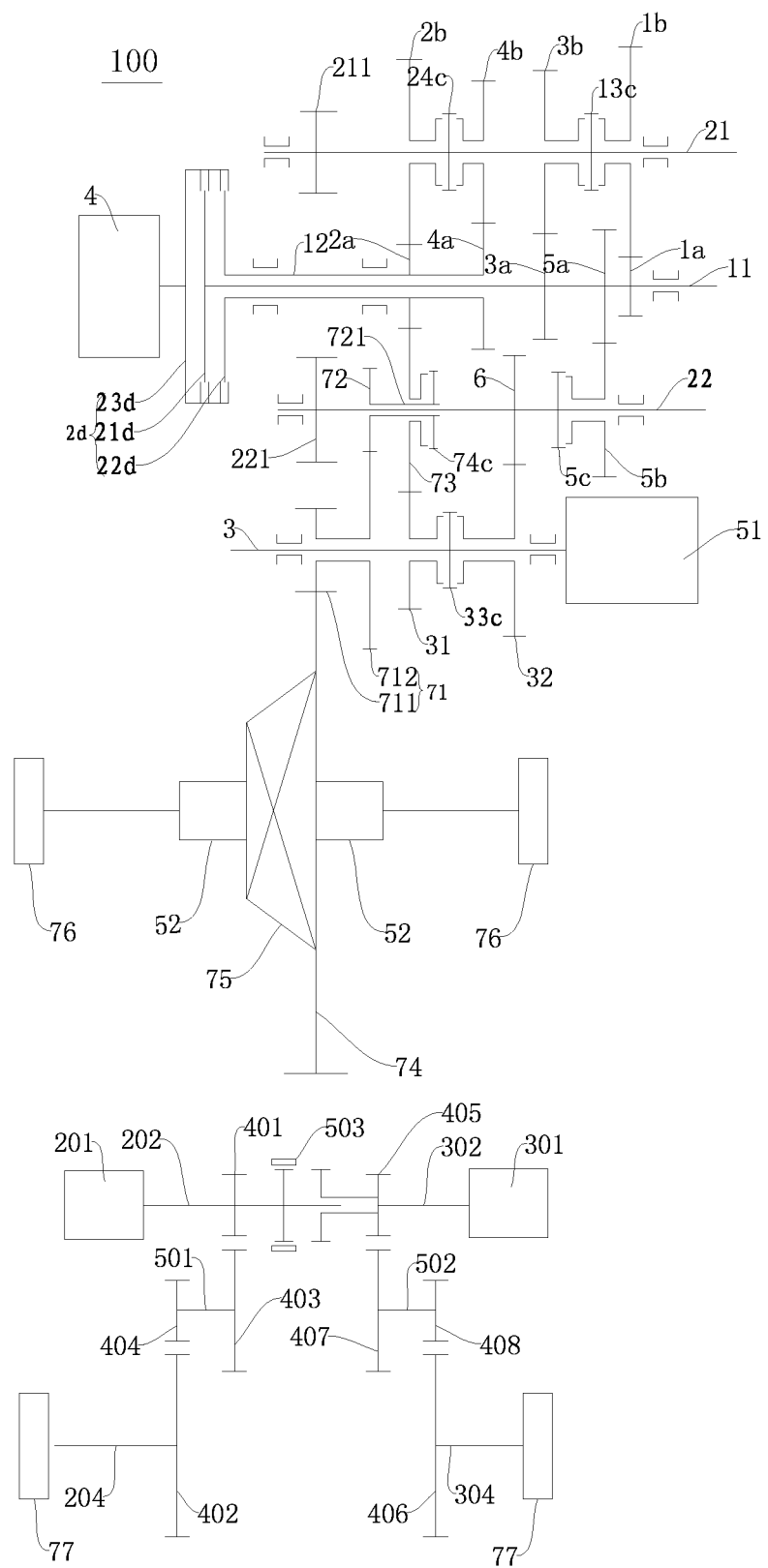
FIG. 6 is a schematic view of an exemplary power transmission system according to an embodiment of the present disclosure.
Figure 10:
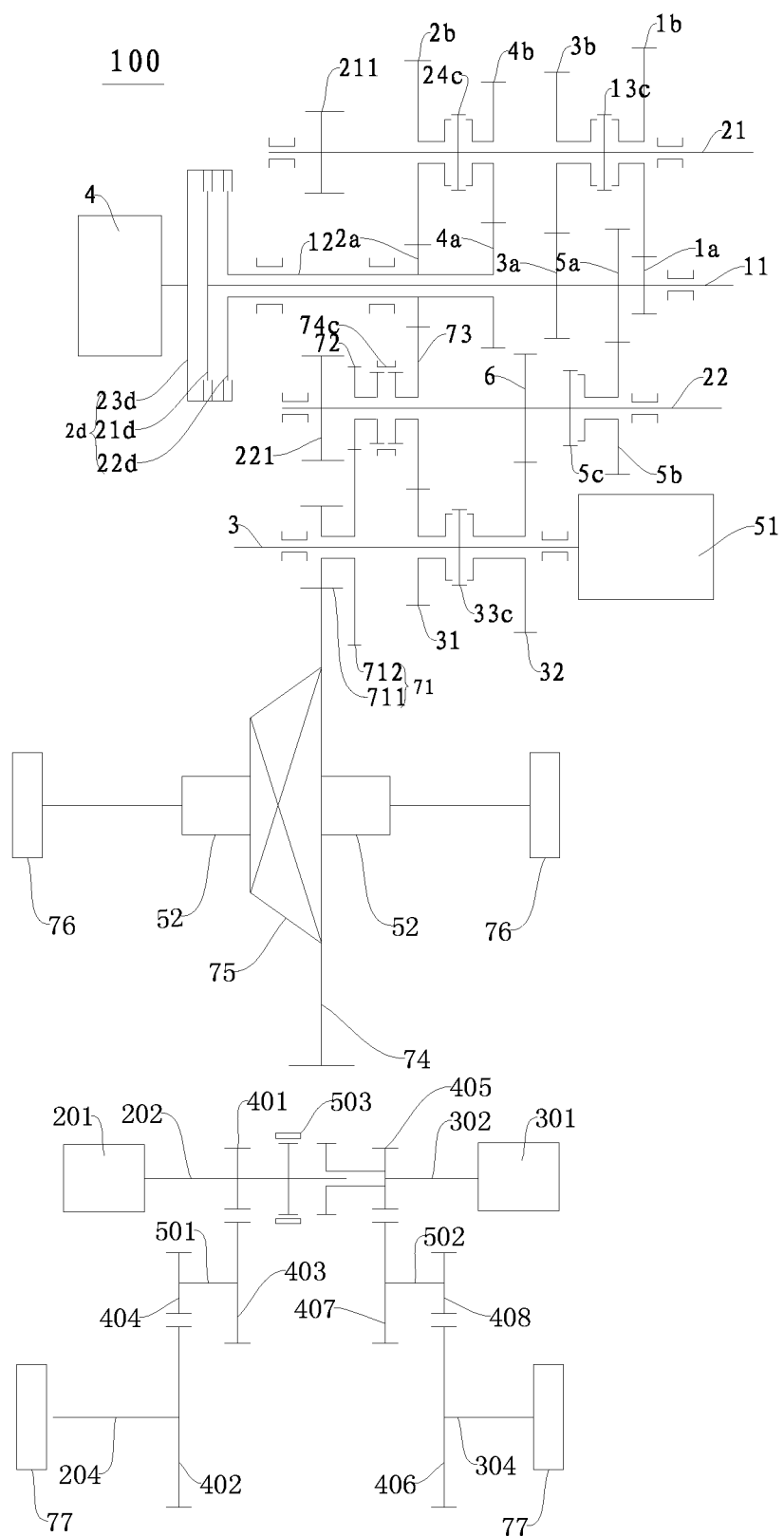
FIG. 10 is a schematic view of an exemplary power transmission system according to an embodiment of the present disclosure.

In some embodiments, as shown in FIGS. 6 and 10, the antiskid synchronizer 503 may be disposed on the first output shaft 202 and configured to selectively engage with the fifth gear 405. In some embodiments, a gear ring may be provided on a side of the fifth gear 405 facing the antiskid synchronizer 503, and the antiskid synchronizer 503 may include an engaging sleeve to adapt to the gear ring. With the engagement of the antiskid synchronizer 503, the second pair of wheels 77 may rotate synchronously.

Figure 7:
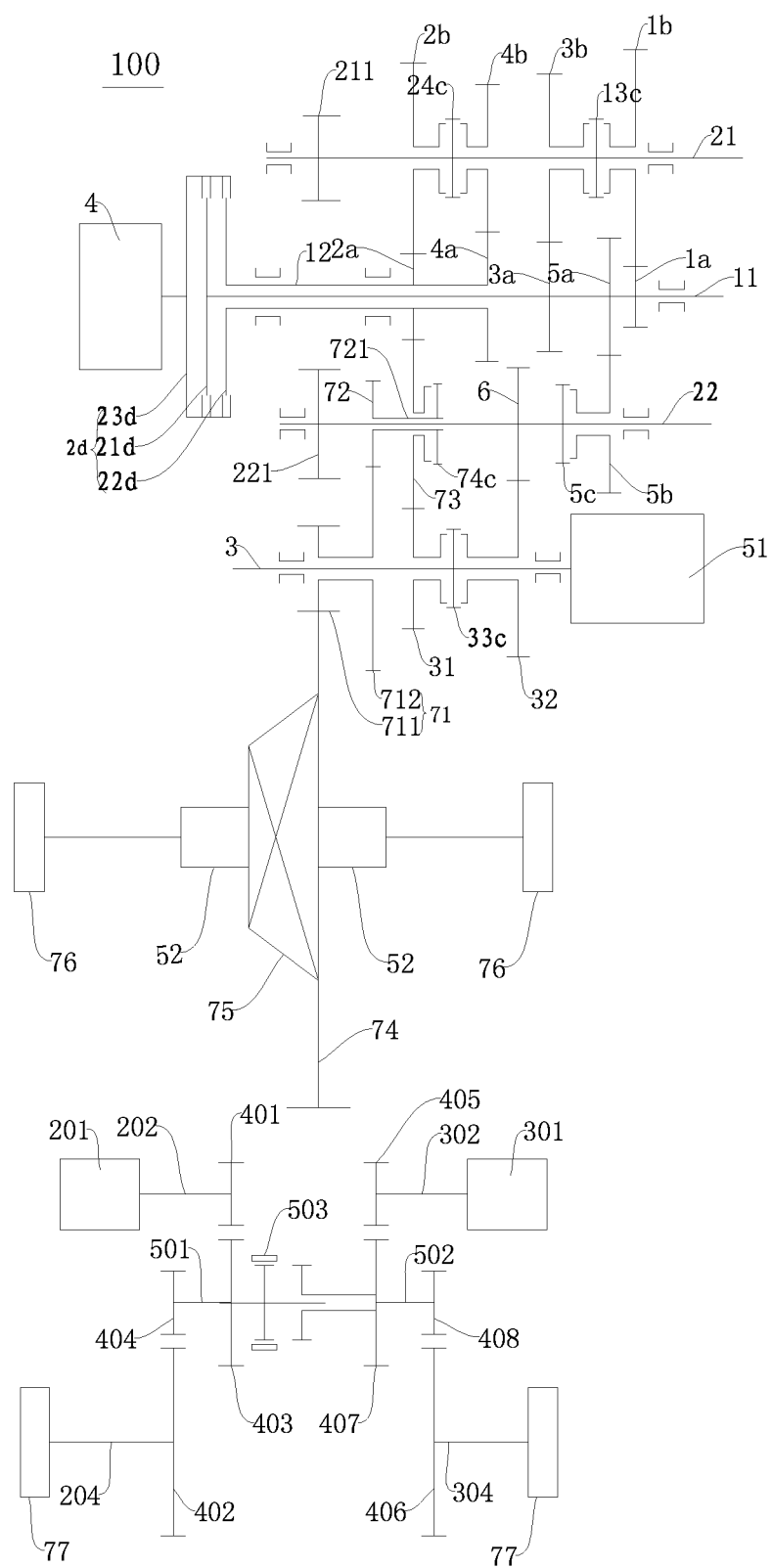
FIG. 7 is a schematic view of an exemplary power transmission system according to an embodiment of the present disclosure.
Figure 11:
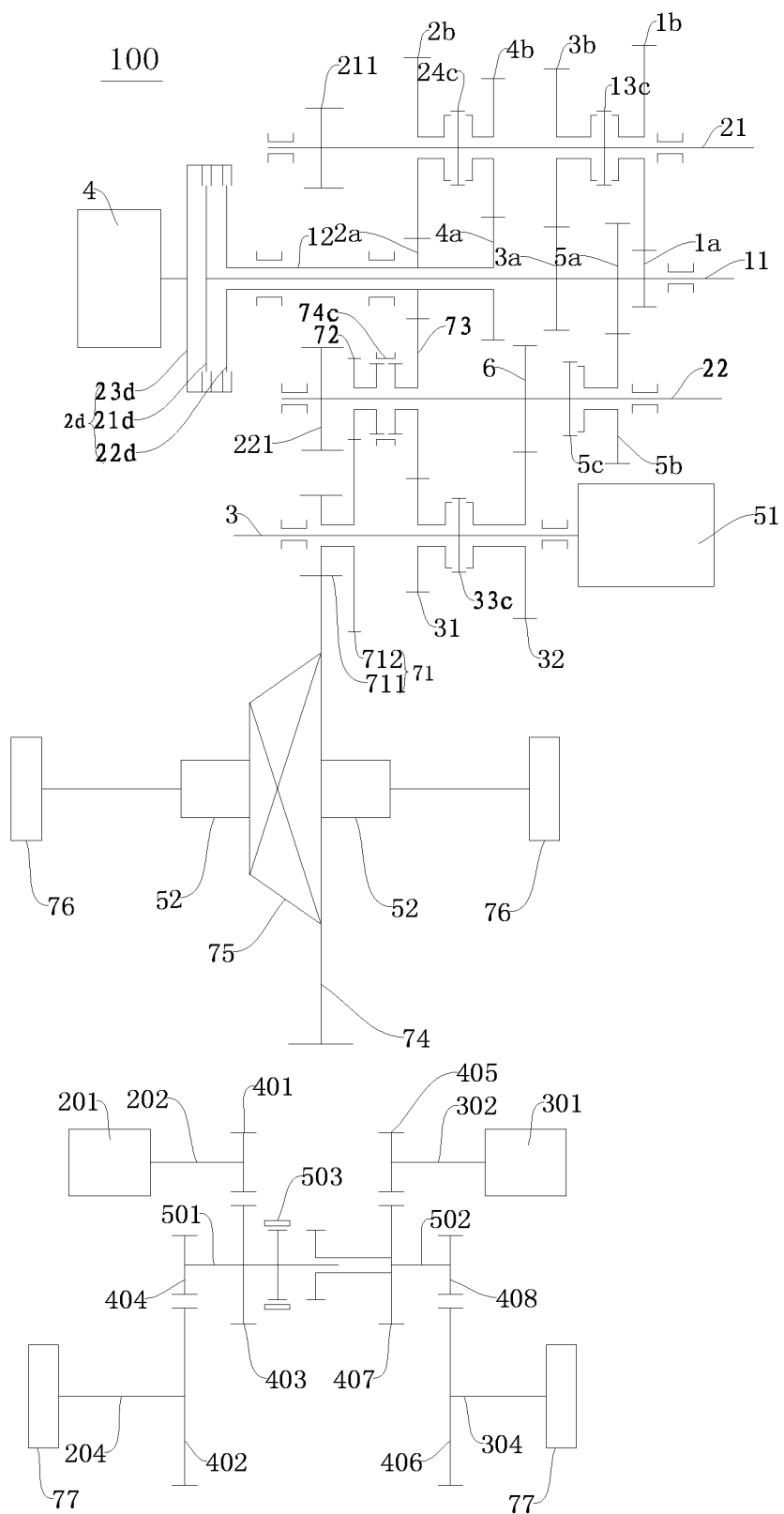
FIG. 11 is a schematic view of an exemplary power transmission system according to an embodiment of the present disclosure.

In some embodiments, as shown in FIGS. 7 and 11, the antiskid synchronizer 503 may be disposed on the first gear shaft 501 and configured to selectively engage with the seventh gear 407. In some embodiments, a gear ring may be provided on a side of the seventh gear 407 facing the antiskid synchronizer 503, and the antiskid synchronizer 503 may include an engaging sleeve to adapt to the gear ring. With the engagement of the antiskid synchronizer 503, the second pair of wheels 77 may rotate synchronously.

Figure 8:
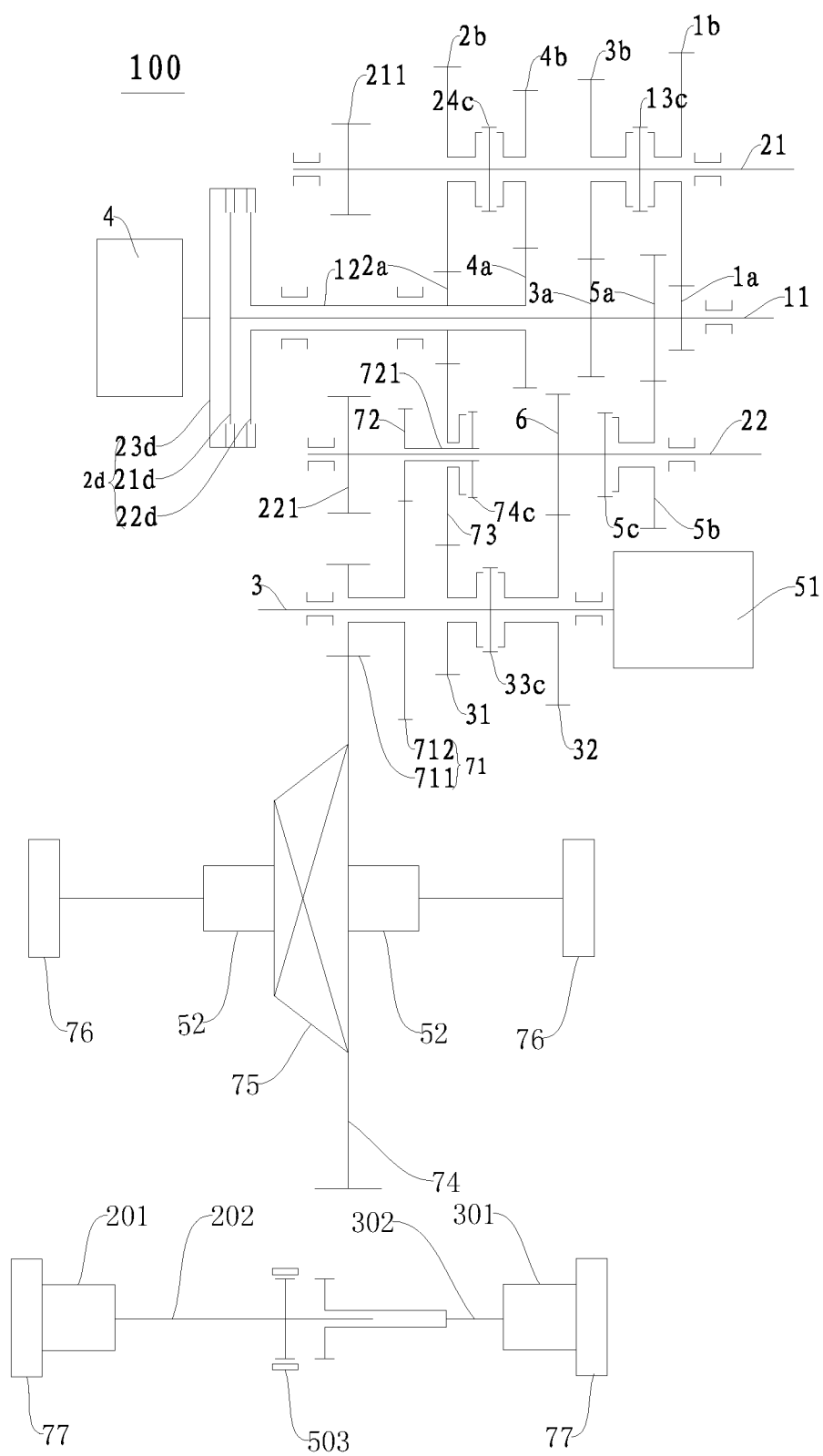
FIG. 8 is a schematic view of an exemplary power transmission system according to an embodiment of the present disclosure.
Figure 12:
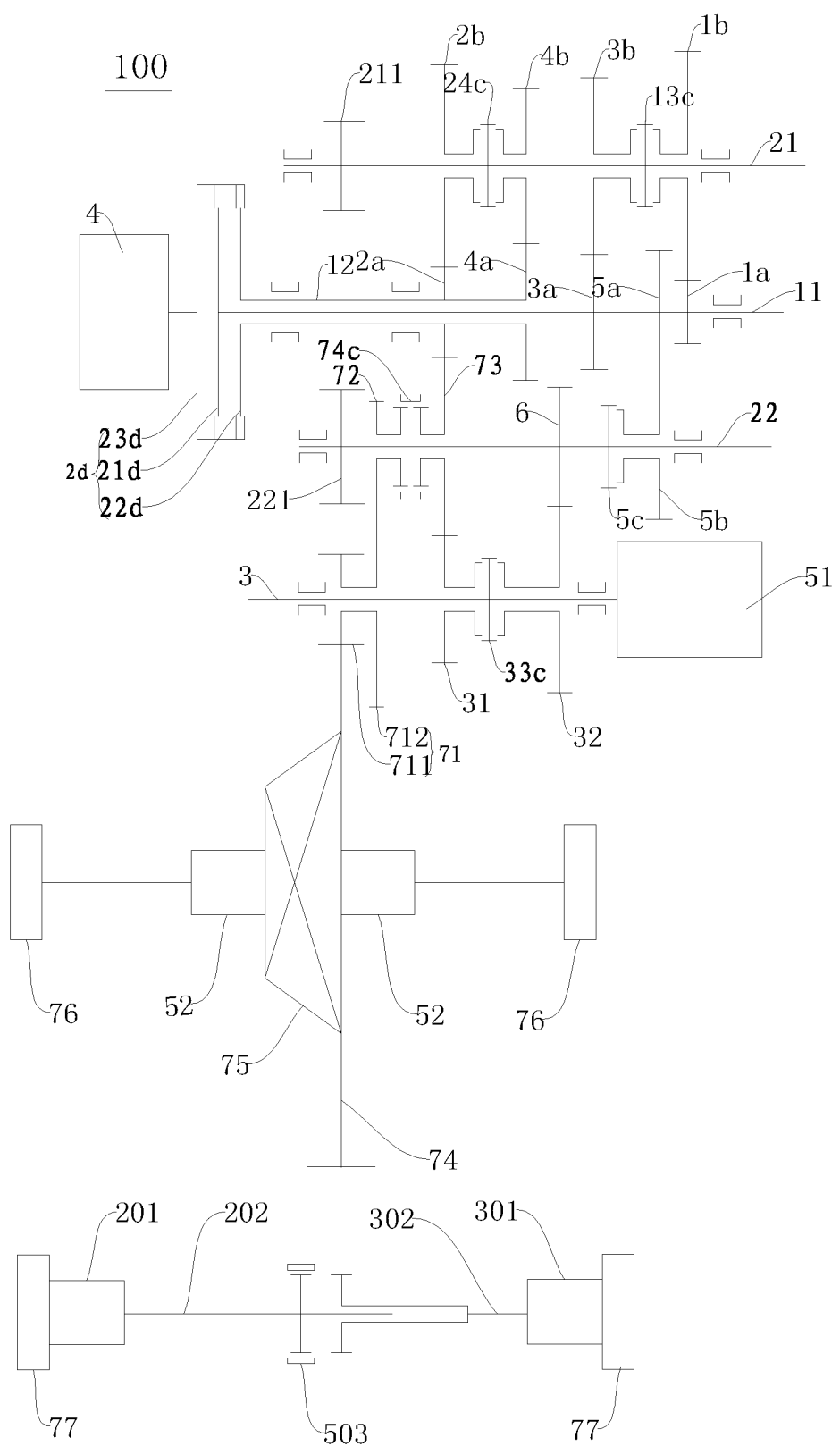
FIG. 12 is a schematic view of an exemplary power transmission system according to an embodiment of the present disclosure.

In some embodiments, as shown in FIGS. 8 and 12, the third motor generator 201 may be connected coaxially with a corresponding wheel, and the fourth motor generator 301 may be connected coaxially with a corresponding wheel. In some embodiments, both the third motor generator 201 and the fourth motor generator 301 may be wheel-side motors, thus shortening the transmission passage, reducing the power transmission loss and enhancing the transmission efficiency.

In some embodiments, as shown in FIGS. 8 and 12, the antiskid synchronizer 503 may be disposed on the first output shaft 202 corresponding to the third motor generator 201, and configured to selectively engage with the second output shaft 302 corresponding to the fourth motor generator 301. With the engagement of the antiskid synchronizer 503, the second pair of wheels 77 may rotate synchronously.

The power transmission system 100 and the conditions of the power transmission system 100 will be described below with reference to FIGS. 2-12.

Embodiment 1

Figure 2:
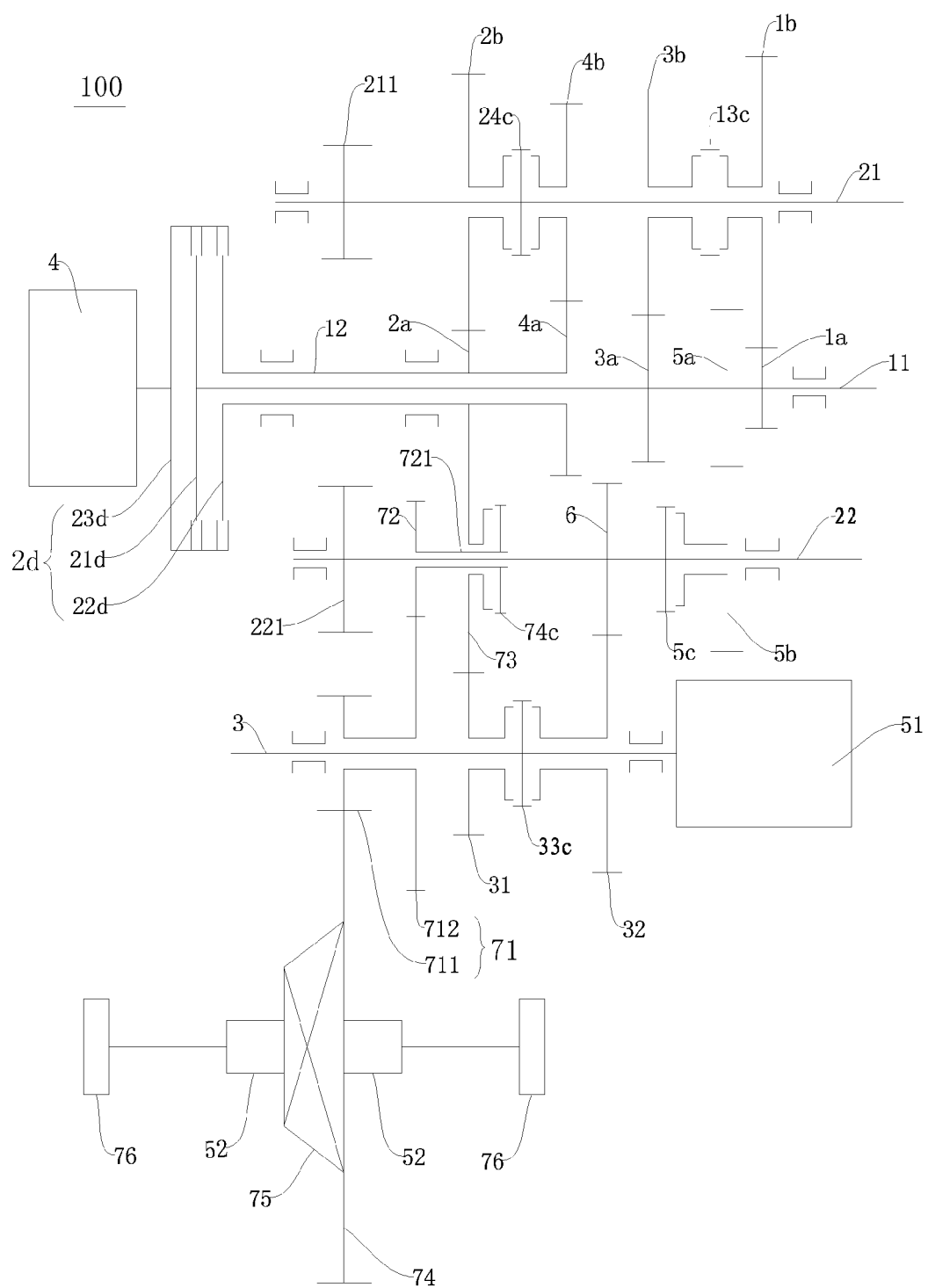
FIG. 2 is a schematic view of an exemplary power transmission system according to an embodiment of the present disclosure.

As shown in FIG. 2, the engine 4 is connected with the input terminal 23d of the dual clutch 2d, the first output terminal 21d of the dual clutch 2d is connected with the first input shaft 11, and the second output terminal 22d of the dual clutch 2d is connected with the second input shaft 12. The input terminal 23d may be disengaged from both the first output terminal 21d and the second output terminal 22d, or the input terminal 23d may engage with one of the first output terminal 21d and the second output terminal 22d, or the input terminal 23d may engage with both the first output terminal 21d and the second output terminal 22d.

The second input shaft 12 may be a hollow shaft, and the first input shaft 11 may be a solid shaft. The second input shaft 12 is coaxially fitted over the first input shaft 11, and a part of the first input shaft 11 extends outside of the second input shaft 12 along an axial direction of the second input shaft 12.

The first-gear shift driving gear 1a, the third-gear shift driving gear 3a and the fifth-gear shift driving gear 5a are disposed on the first input shaft 11 and configured to rotate synchronously with the first input shaft 11. The first-gear shift driving gear 1a is positioned on the right side of the fifth-gear shift driving gear 5a, and the third-gear shift driving gear 3a is positioned on the left side of the fifth-gear shift driving gear 5a.

The second-gear shift driving gear 2a and the fourth-gear shift driving gear 4a are disposed on the second input shaft 12 and configured to rotate synchronously with the second input shaft 12, and the second-gear shift driving gear 2a is positioned on the left side and the fourth-gear shift driving gear 4a is positioned on the right side.

The first output shaft 21 is arranged parallel to the two input shafts, i.e. the first and second input shafts 11, 12. The first-gear shift driven gear 1b, the second-gear shift driven gear 2b, the third-gear shift driven gear 3b and the fourth-gear shift driven gear 4b are freely fitted over the first output shaft 21. The first-gear shift driven gear 1b is configured to mesh directly with the first-gear shift driving gear 1a, the second-gear shift driving gear 2a is configured to mesh directly with the second-gear shift driven gear 2b, the third-gear shift driving gear 3a is configured to mesh directly with the third-gear shift driven gear 3b, and the fourth-gear shift driving gear 4a is configured to mesh directly with the fourth-gear shift driven gear 4b.

The first-third gear synchronizer 13c, the second-fourth gear synchronizer 24c are disposed on the first output shaft 21, and the first-third gear synchronizer 13c is positioned between the first-gear shift driven gear 1b and the third-gear shift driven gear 3b and configured to selectively synchronize the first-gear shift driven gear 1b with the first output shaft 21 and to selectively synchronize the third-gear shift driven gear 3b and the first output shaft 21. The second-fourth gear synchronizer 24c is positioned between the second-gear shift driven gear 2b and the fourth-gear shift driven gear 4b and configured to selectively synchronize the second-gear shift driven gear 2b and the first output shaft 21 or to selectively synchronize the fourth-gear shift driven gear 4b and the first output shaft 21.

The second output shaft 22 is arranged parallel to the two input shafts, i.e. the first and second input shafts 11, 12. The fifth-gear shift driven gear 5b is freely fitted over the second output shaft 22 and configured to directly mesh with the fifth-gear shift driving gear 5a. The fifth-gear synchronizer 5c is disposed on the second output shaft 22 and configured to synchronize the fifth-gear shift driven gear 5b and the second output shaft 22.

The motor power shaft 3 is disposed coaxially with the two input shafts such as the first and second input shafts 11, 12 and the two output shafts such as the first and second output shafts 21, 22. The first motor gear 31 and the second motor gear 32 are freely fitted over the motor power shaft 3, and the first motor gear 31 is on the left while the second motor gear 32 is on the right. The motor synchronizer 33c is disposed on the motor power shaft 3 and positioned between the first motor gear 31 and the second motor gear 32. The motor synchronizer 33c is configured to selectively synchronize the first motor gear 31 and the motor power shaft 3 or to selectively synchronize the second motor gear 32 and the motor power shaft 3.

As shown in FIG. 2, the transmission gear 6 is disposed on the second output shaft 22 and configured to rotate synchronously with the second output shaft 22, and the reverse idler gear 72 is freely fitted over the second output shaft 22. The transmission gear 6 is configured to directly mesh with the second output shaft 22. The reverse idler gear 72 includes a gear sleeve 721 at one side thereof, and the gear sleeve 721 is freely fitted over the second output shaft 22. The middle idler 73 is freely fitted over the gear sleeve 721 and configured to mesh with the second-gear shift driving gear 2a and the first motor gear 31 respectively. The reverse synchronizer 74c is arranged on the gear sleeve 721 and configured to engage with the middle idler 73.

The reverse gear 71 is configured as a duplex gear and includes a first gear part 712 configured to mesh with the reverse idler gear 72 and a second gear part 713 configured to directly mesh with the shift driven gear 74. The first output gear 211 is fixed on the first output shaft 21 and configured to mesh with the shift driven gear 74. The second output gear 221 is fixed on the second output shaft 22 and configured to mesh with the shift driven gear 74.

The first motor generator 51 and the motor power shaft 3 are coaxially connected.

A condition in which the power transmission system 100 according to embodiments of the present disclosure may be used will be discussed below in detail with reference to FIG. 2.

Parking-Charging Condition

The input terminal 23d of the dual clutch 2d is engaged with the second output terminal 22d while disengaged from the first output terminal 21d. The motor synchronizer 33c engages the first motor gear 31, such that power output by the engine 4 may be transmitted to the first motor generator 51 via the input terminal 23d, the second output terminal 22d, the second input shaft 12, the second-gear shift driving gear 2a, the middle idler 73, the first motor gear 31, the motor synchronizer 33c and the motor power shaft 3 sequentially, thus driving the first motor generator 51 to generate electric power.

In the parking-charging condition, charging the vehicle with a fixed speed ratio may be achieved, and the power transmission efficiency may be increased. Those with ordinary skill in the art will appreciate that the speed ratio relates to parameters such as the rotating speed of the engine 4 in the parking state, the type of the first motor generator 51, and maximum rotating speed acceptable by the peripheral parts such as bearings, and so on. In the present disclosure, the speed ratio may be designed according to the above parameters and the power transmission ratio may be flexibly designed, thus making maximum use of the power from the engine 4 and achieving the object of quick charging. In the parking-charging condition, power from the engine 4 may be transmitted via a passage consisting of the second input shaft 12, the middle idler 73, the first motor gear 31 and the motor power shaft 3, and therefore the object of charging with an optimal fixed speed ratio may be achieved, and both the charging efficiency and the fuel economy of the engine are improved.

When the power transmission system 100 is in the parking-charging condition, the first motor generator 51 functions as a generator and can rotate along a predetermined rotating direction, such as the clockwise direction.

Pure Electric Condition

First Transmission Path

The motor synchronizer 33c engages the first motor gear 31, and power output by the first motor generator 51 is transmitted to the second input shaft 12 via the first motor gear 31 and the middle idler 73. Then the second-fourth gear synchronizer 24c engages the second-gear shift driven gear 2b or the fourth-gear shift driven gear 4b, and therefore the power from the first motor generator 51 is output via the second-gear gear pair or the fourth-gear gear pair.

Second Transmission Path

The motor synchronizer 33c engages the second motor gear 32, and power output by the first motor generator 51 is transmitted to the second output shaft 22 via the second motor gear 32 and the transmission gear 6, and then output from the second output shaft 22.

In the electric condition such as the first electric condition or the second electric condition, power from the first motor generator 51 may be transmitted to wheels of the vehicle via two power transmission passages having different speed ratios, thus driving the vehicle to run. In cases when the first motor generator 51 is used to start, to accelerate, to climb or to run, different speed ratios may be selected accordingly to improve the operation efficiency of the first motor generator 51.

In some embodiments, when switching from the first electric condition to the second electric condition, the first motor generator 51 may adjust the rotating speed of the motor power shaft 3.

When switching from the first transmission path to the second transmission path, the motor synchronizer 33c moves from an engaging position at the first motor gear 31 to an engaging position at the second motor gear 32. During this period, the first motor generator 51 may adjust the rotating speed of the motor power shaft 3 with the rotating speed of the second motor gear 32 as a target speed. In this way, the rotating speed of the motor power shaft 3 is matched with the rotating speed of the second motor gear 32, and thereby the motor synchronizer 33c may engage with the second motor gear 32 rapidly. Thus the synchronization efficiency can be improved.

When switching from the second transmission path to the first transmission path, the motor synchronizer 33c moves from an engaging position at the second motor gear 32 to an engaging position at the first motor gear 31. During this period, the first motor generator 51 may adjust the rotating speed of the motor power shaft 3 with the rotating speed of the first motor gear 31 as a target speed. In this way, the rotating speed of the motor power shaft 3 is matched with the rotating speed of the first motor gear 31, and thereby the motor synchronizer 33c may engage with the first motor gear 31 rapidly. Thus the synchronization efficiency is improved.

A person with ordinary skill in the art will appreciate that, in addition to the electric condition such as the first and second electric conditions, the speed adjusting mode described above may be used in other conditions, such as in a hybrid condition, provided change of the engaging state of the motor synchronizer 33c is related. For example, the above speed adjusting mode may be used in a condition in which the motor synchronizer 33c changes from engaging with the first motor gear 31 to engaging with the second motor gear 32. As another example, the above speed adjusting mode may be used in a condition in which the motor synchronizer 33c changes from engaging with the second motor gear 32 to engaging with the first motor gear 31.

When the power transmission system 100 is operated in the pure electric condition, the first motor generator 51 functions as a motor and can rotate along a predetermined rotating direction, such as the clockwise direction.

First Hybrid Conditions

First First-Gear Hybrid Condition

In the first first-gear hybrid condition, the first-third gear synchronizer 13c is engaged with the first-gear shift driven gear 1b, the input terminal 23d of the dual clutch 2d is engaged with the first output terminal 21d and disengaged from the second output terminal 22d, and the motor synchronizer 33c is engaged with the second motor gear 32. First power output by the engine 4 is transmitted to the first output shaft 21 via the first input shaft 11 and the first-gear gear pair, and second power output by the first motor generator 51 is transmitted to the second output shaft 22 via the second motor gear 32 and the transmission gear 6. The first power and the second power are coupled at the driven gar 74, and then distributed to wheels by the differential 75.

In the first first-gear hybrid condition, the first motor generator 51 may adjust the speed, such that the shift driven gear 74 may synchronously receive the first power from the engine 4 and the second power from the first motor generator 51, thus ensuring a smooth power transmission.

First Second-Gear Hybrid Condition

In the first second-gear hybrid condition, the second-fourth gear synchronizer 24c is engaged with the second-gear shift driven gear 2b, the input terminal 23d of the dual clutch 2d is engaged with the second output terminal 22d and disengaged from the first output terminal 21d, and the motor synchronizer 33c is engaged with the second motor gear 32. First power output by the engine 4 is transmitted to the first output shaft 21 via the second input shaft 12 and the second-gear gear pair, and second power output by the first motor generator 51 is transmitted to the second output shaft 22 via the second motor gear 32 and the transmission gear 6. The first power and the second power are coupled at the driven gar 74, and then distributed to wheels by the differential 75.

In the first second-gear hybrid condition, the first motor generator 51 may adjust the speed, such that the shift driven gear 74 may synchronously receive the first power from the engine 4 and the second power from the first motor generator 51, thus ensuring a smooth power transmission.

First Third-Gear Hybrid Condition

In the first third-gear hybrid condition, the power transmission system 100 operates substantially the same as that in the first first-gear hybrid condition, with the exception that the first-third gear synchronizer 13c is engaged with the third-gear shift driven gear 3b and first power output by the engine 4 is output via the third-gear gear pair.

First Fourth-Gear Hybrid Condition

In the first fourth-gear hybrid condition, the power transmission system 100 operates substantially the same as that in the first second-gear hybrid condition, with the exception that the second-fourth gear synchronizer 24c is engaged with the fourth-gear shift driven gear 4b and first power output by the engine 4 is output via the fourth-gear gear pair.

First Fifth-Gear Hybrid Condition

In the first fifth-gear hybrid condition, the fifth gear synchronizer 5c is engaged with the first-gear shift driven gear 1b, the input terminal 23d of the dual clutch 2d is engaged with the first output terminal 21d and disengaged from the second output terminal 22d, and the motor synchronizer 33c is engaged with the second motor gear 32. First power output by the engine 4 is transmitted to the second output shaft 22 via the first input shaft 11 and the fifth-gear gear pair, and second power output by the first motor generator 51 is transmitted to the second output shaft 22 via the second motor gear 32 and the transmission gear 6. The first power and the second power are coupled at the driven gar 74, and then distributed to wheels by the differential 75.

In the first fifth-gear hybrid condition, the first motor generator 51 may adjust the speed, such that the second output shaft 22 may synchronously receive the first power from the engine 4 and the second power from the first motor generator 51, thus ensuring a smooth power transmission.

Second Hybrid Conditions

Second First-Gear Hybrid Condition

In the second first-gear hybrid condition, the first-third gear synchronizer 13c is engaged with the first-gear shift driven gear 1b, the second-fourth gear synchronizer 24c is engaged with the second-gear shift driven gear 1b (power from the first motor generator 51 is output via the second-gear gear pair or via the fourth-gear gear pair). The input terminal 23d of the dual clutch 2d is engaged with the first output terminal 21d but disengaged from the second output terminal 22d, and the motor synchronizer 33c is engaged with the first motor gear 31.

First power output by the engine 4 is transmitted to the first output shaft 21 via the first input shaft 11 and the first-gear gear pair, and second power output by the first motor generator 51 is transmitted to the first output shaft 21 via the first motor gear 31, the middle idler 73, the second-gear gear pair and the second-fourth gear synchronizer 24c. The first power and the second power are coupled at the first output shaft 21, and then distributed to wheels by the differential 75.

In the second first-gear hybrid condition, the first motor generator 51 may adjust the speed, such that the first output shaft 21 may synchronously receive the first power from the engine 4 and the second power from the first motor generator 51, thus ensuring a smooth power transmission.

Second Second-Gear Hybrid Condition

In the second second-gear hybrid condition, the second-fourth gear synchronizer 24c is engaged with the second-gear shift driven gear 2b, the input terminal 23d of the dual clutch 2d is engaged with the second output terminal 22d but disengaged from the first output terminal 21d, and the motor synchronizer 33c is engaged with the first motor gear 31.

First power output by the engine 4 is transmitted to the second-gear gear pair via the second input shaft 12, and second power output by the first motor generator 51 is transmitted to the second-gear gear pair via the first motor gear 31 and the middle idler 73. The first power and the second power are coupled at the second-gear gear pair, and then output by the first output shaft 21.

In the second second-gear hybrid condition, the first motor generator 51 may adjust the speed, such that the second-gear gear pair may synchronously receive the first power from the engine 4 and the second power from the first motor generator 51, thus ensuring a smooth power transmission.

Second Third-Gear Hybrid Condition

In the second third-gear hybrid condition, the power transmission system 100 operates substantially the same as that in the second first-gear hybrid condition, with the exception that the first-third gear synchronizer 13c is engaged with the third-gear shift driven gear 3b and first power output by the engine 4 is output via the third-gear gear pair.

As the second-fourth gear pair shares a second-fourth gear synchronizer 24c, an assumed second fourth-gear hybrid condition may not be achieved.

Second Fifth-Gear Hybrid Condition

In the second fifth-gear hybrid condition, the fifth gear synchronizer 5c is engaged with the fifth shift driven gear 5b, and the second-fourth gear synchronizer 24c is engaged with the second-gear shift driven gear 24b. The input terminal 23d of the dual clutch 2d is engaged with the first output terminal 21d but disengaged from the second output terminal 22d, and the motor synchronizer 33c is engaged with the first motor gear 31.

First power output by the engine 4 is transmitted to the second output shaft 22 via the first input shaft 11 and the fifth-gear gear pair, and second power output by the first motor generator 51 is transmitted to the first output shaft 21 via the first motor gear 32, the middle idler 73, the second-gear gear pair and the second-fourth gear synchronizer 24c. The first power and the second power are coupled at the driven gar 74, and then distributed to wheels by the differential 75.

In the second fifth-gear hybrid condition, the first motor generator 51 may adjust the speed, such that the shift driven gear 74 may synchronously receive the first power from the engine 4 and the second power from the first motor generator 51, thus ensuring a smooth power transmission.

In the specification of the present disclosure, the above mentioned hybrid conditions are discussed by an example in which the second-fourth gear synchronizer 24c is engaged with the second-gear shift driven gear 2b. It should be noted that, in other hybrid conditions, the second-fourth gear synchronizer 24c may engage with the fourth-gear shift driven gear 4b. In these hybrid conditions, the power transmission principles are substantially the same as those described above, thus details thereof are omitted herein. Those with ordinary skill in the art may also appreciate that, in examples that the second-fourth gear synchronizer 24c is engaged with the fourth-gear shift driven gear 4b, an assumed second second-gear hybrid condition may not be achieved, the reason of which is similar to those discussed for the assumed second fourth-gear hybrid condition.

In the present disclosure, a person skilled in the art may flexibly select any of the above hybrid conditions and power transmission passages thereof according to practical requirements. With these hybrid conditions, more driving fun may be provided to the users. In addition, the vehicle may be used in different road conditions, thus enhancing both the power and the fuel economy of the vehicle.

In the above hybrid conditions (i.e. first and second hybrid conditions), the first motor generator 51 functions as a generator and can rotate along a predetermined rotating direction, such as the clockwise direction.

First Driving-Charging Condition
First First-Gear Driving-Charging Condition

In the first first-gear driving-charging condition, the first-third gear synchronizer 13c is engaged with the first-gear shift driven gear 1b, the input terminal 23d of the dual clutch 2d is engaged with the first output terminal 21d but disengaged from the second output terminal 22d, and the motor synchronizer 33c is engaged with the second motor gear 32. Power output by the engine 4 is transmitted to the first output shaft 21 via the first input shaft 11 and the first-gear gear pair. Power generated by the wheels is transmitted to the first motor generator 51 via the second motor gear 32, the transmission gear 6, the second motor gear 32 and the motor power shaft 3, such that the first motor generator 51 is driven to generate electric power.

First Second-Gear Driving-Charging Condition

In the first second-gear driving-charging condition, the second-fourth gear synchronizer 24c is engaged with the second-gear shift driven gear 2b, the input terminal 23d of the dual clutch 2d is engaged with the second output terminal 22d but disengaged from the first output terminal 21d, and the motor synchronizer 33c is engaged with the first motor gear 31. A part of power output by the engine 4 is transmitted to the first output shaft 21 via the second input shaft 12 and the second-gear gear pair, the other part of power generated by the engine 4 is transmitted to the first motor generator 51 via the second input shaft 12, the middle idler 73, the first motor gear 31 and the motor power shaft 3, such that the first motor generator 51 is driven to generate electric power.

First Third-Gear Driving-Charging Condition

In the first third-gear driving-charging condition, the power transmission system 100 operates substantially the same as that in the first-gear driving-charging condition, with the exception that the first-third gear synchronizer 13c is engaged with the third-gear shift driven gear 3b.

First Fourth-Gear Driving-Charging Condition

In the first fourth-gear driving-charging condition, the power transmission system 100 operates substantially the same as that in the second-gear driving-charging condition, with the exception that the second-fourth gear synchronizer 24c is engaged with the fourth-gear shift driven gear 4b.

First Fifth-Gear Driving-Charging Condition

In the first fifth-gear driving-charging condition, the fifth gear synchronizer 5c is engaged with the fifth shift driven gear 5b, the input terminal 23d of the dual clutch 2d is engaged with the first output terminal 21d but disengaged from the second output terminal 22d, and the motor synchronizer 33c is engaged with the second motor gear 32. Power output by the engine 4 is transmitted to the second output shaft 22 via the first input shaft 11 and the fifth gear pair, and a part of power from the second output shaft 22 is transmitted to the first motor generator 51 via the transmission gear 6, the second motor gear 32 and the motor power shaft 3, such that the first motor generator 51 is driven to generate electric power.

Second Driving-Charging Condition
Second First-Gear Driving-Charging Condition

In the second first-gear driving-charging condition, one of the two gear parts of the dual clutch 2d is engaged when performing power transmission, for example, the input terminal 23d is engaged with the first output terminal 21d or engaged with the second output terminal 22d. In the second first-gear driving-charging condition, the input terminal 23d is engaged with both the first output terminal 21d and the second output terminal 22d, thus achieving a new driving-charging condition.

In the second first-gear driving-charging condition, the input terminal 23d of the dual clutch 2d is engaged with the first output terminal 21d and the second output terminal 22d simultaneously. A part of power output by the engine 4 is transmitted to the first output shaft 21 via the first input shaft 11 and the first-gear gear pair, and the other part of power output by the engine 4 is transmitted to the first motor generator 51 via the second input shaft 12, the middle idler 73, the first motor gear 31 and the motor power shaft 3, such that the first motor generator 51 is driven to generate electric power.

Second Third-Gear Driving-Charging Condition

In the second third-gear driving-charging condition, the power transmission system 100 operates substantially the same as that in the second first-gear driving-charging condition, with the exception that the first-third synchronizer 13c is engaged with the third-gear shift driven gear 3b.

Second Fifth-Gear Driving-Charging Condition

In the second fifth-gear driving-charging condition, the power transmission system 100 operates substantially the same as that in the second first-gear driving-charging condition, with the exception that the fifth synchronizer 5c is engaged with the fifth-gear shift driven gear 5b and power is output from the second output shaft 22.

In the present disclosure, a person skilled in the art may flexibly select any of the above hybrid conditions and power transmission passages thereof according to practical requirements. With these hybrid conditions, more driving fun may be provided to the users. In addition, the vehicle may be used in different road conditions, thus enhancing both the power and the fuel economy of the vehicle.

In the driving-charging conditions, a part of power from the engine 4 may be transmitted via a passage consisting of the second input shaft 12, the middle idler 73, the first motor gear 31 and the motor power shaft 3, and therefore the object of charging with an optimal fixed speed ratio may be achieved, and both the charging efficiency and the fuel economy of the engine are improved.

In the above driving-charging conditions, the first motor generator 51 functions as a generator and can rotate along a predetermined rotating direction, such as the clockwise direction.

Reverse Condition
Mechanical Reverse Condition

In the mechanical reverse condition, the reverse synchronizer 74c synchronizes reverse idler gear 72 and the middle idler 73, the input terminal 23d of the dual clutch 2d is engaged with the second output terminal 22d but disengaged from the first output terminal 21d. First power generated by the engine 4 may be transmitted via the first input shaft 12, the middle idler 73 and reverse idler gear 72, and then output by the reverse gear 71.

Electric Reverse Condition

In the electric reverse mode, the motor synchronizer 33c synchronizes the motor power shaft 3 and the first motor gear 31, and the reverse synchronizer 74c synchronizes reverse idler gear 72 and the middle idler 73. Power output by the first motor generator 51 may be transmitted via the motor power shaft 3, the first motor gear 31, the middle idler 73 and reverse idler gear 72, and then output by the reverse gear 71.

Hybrid (Electric-Mechanic) Reverse Condition

In the hybrid electric reverse mode, the motor synchronizer 33c synchronizes the motor power shaft 3 and the first motor gear 31, and the reverse synchronizer 74c synchronizes reverse idler gear 72 and the middle idler 73. First Power output by the engine is transmitted to the middle idler 73 via the second input shaft 12, and second power output by the first motor generator 51 is transmitted to the middle idler 73 via the motor power shaft 3. The first power and the second power are coupled at the middle idler 73 and transmitted to the reverse idler gear 72, and then output by the reverse gear 71.

In comparison with a conventional transmission system in which a motor needs to be rotate reversely in order to reverse the vehicle In the above reverse conditions, the first motor generator 51 of the power transmission system 100 according to embodiments of the present disclosure may always rotate along the original rotating direction (the predetermined rotating direction such as the clockwise direction) without changing the rotating direction of the first motor generator 51.

With the power transmission system 100 according to embodiments of the present disclosure, the first motor generator 51 may always rotate along the predetermined rotating direction in all the above-mentioned conditions. In other words, the first motor generator 51 may always rotate along the predetermined rotating direction when functioning as a motor or as a generator. Even during the power transmission system 100 switching from one condition to the reverse condition, the rotating direction of the first motor generator 51 needs not to be changed. Therefore, the first motor generator 51 may always rotate along the predetermined rotating direction in all related conditions, such that problems of shock and interruption due to direction change of the motor may be avoided, and the life of the power transmission system 100 may be prolonged.

Embodiment 2

Figure 3:
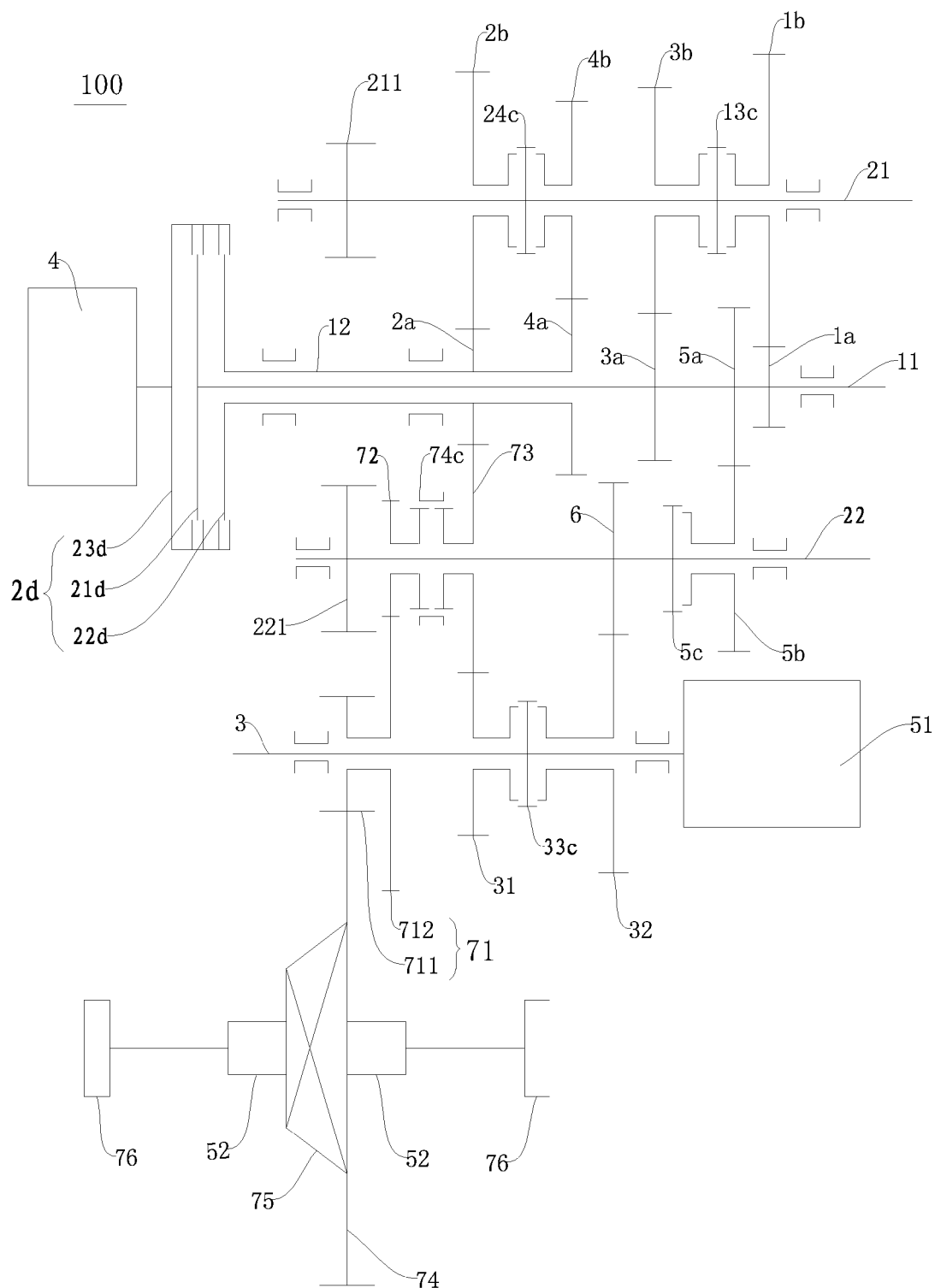
FIG. 3 is a schematic view of an exemplary power transmission system according to an embodiment of the present disclosure.

As shown in FIG. 3, the power transmission system 100 in the present embodiment is substantially the same as that in Embodiment 2, with the following exceptions. The reverse idler gear 72 is fitted over the second output shaft 22, the middle idler 73 is fitted over the second output shaft 22 and adjacent to the reverse idler gear 72, and the reverse synchronizer 74c is disposed on the middle idler 73 and configured to engage with the reverse idler gear 72.

Embodiment 3

Figure 4:
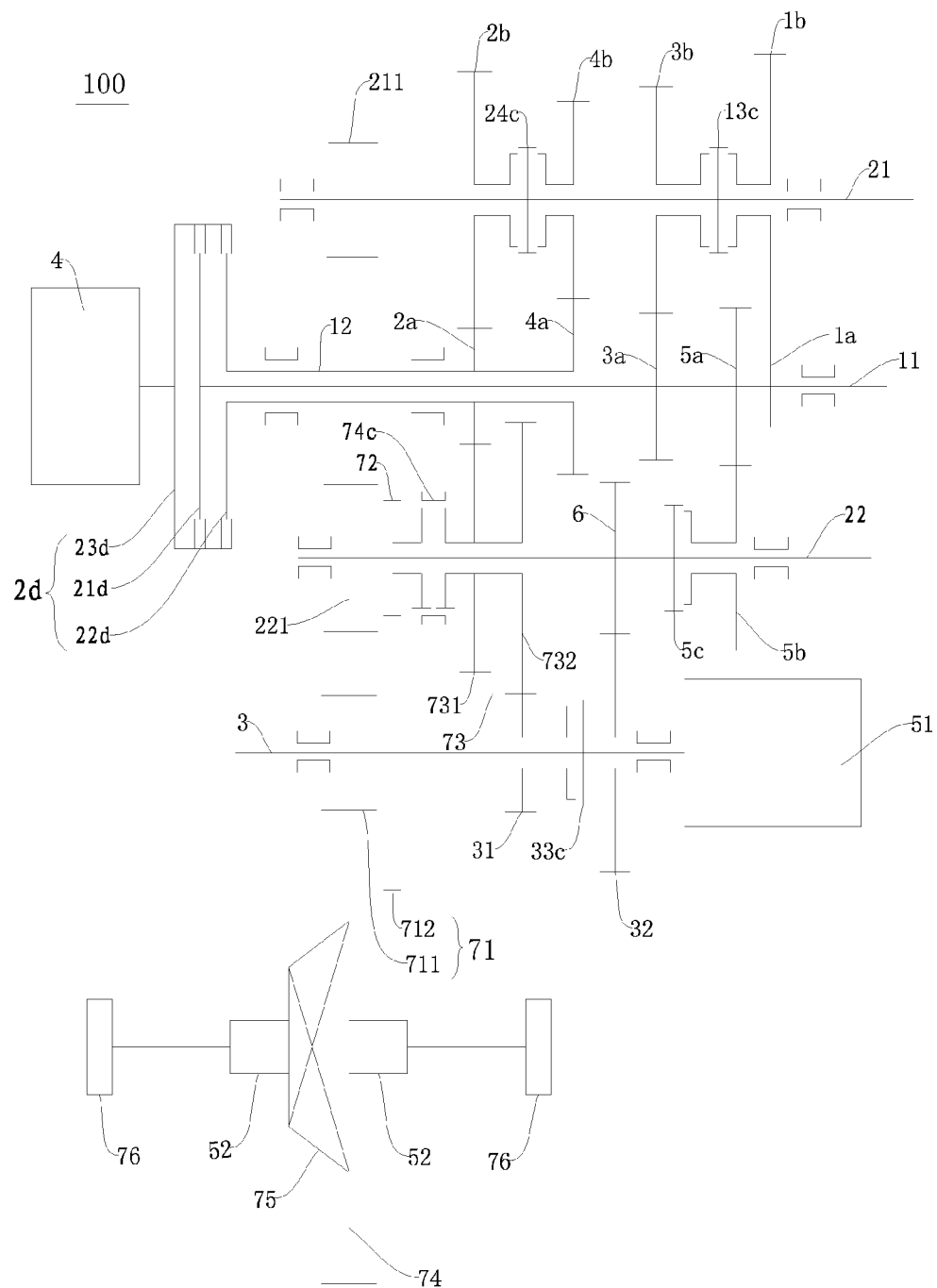
FIG. 4 is a schematic view of an exemplary power transmission system according to an embodiment of the present disclosure.

As shown in FIG. 4, the power transmission system 100 in the present embodiment is substantially the same as that in Embodiment 3, with the following exceptions. The middle idler 73 is a duplex gear and includes a first gear part 731 and a second gear part 732. The first gear part 731 is configured to mesh with the second-gear shift driving gear, i.e. shift driving gear(s) on one of the input shafts. The second gear part 732 is configured to mesh with the first motor gear 31.

Embodiments 4-7

As shown in FIGS. 5-8, the power transmission systems 100 in these present embodiments are substantially the same as those in Embodiment 2, with the exception that a rear-wheel driving mechanism, a third motor generator 201, a fourth motor generator 301 and an antiskid synchronizer 503 are added respectively.

Embodiments 8-11

As shown in FIGS. 9-12, the power transmission systems 100 in these present embodiments are substantially the same as those in Embodiment 3, with the exception that a rear-wheel driving mechanism, a third motor generator 201, a fourth motor generator 301 and an antiskid synchronizer 503 are added respectively.

Embodiments of the present disclosure further provide a vehicle including the above-identified power transmission system 100. Other configuration such as the driving system, the turning system and the braking system may be well known to those skilled in the art, thus details thereof are omitted herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A transmission unit for a vehicle, comprising:
    a plurality of input shafts, each of the input shafts being provided with a shift driving gear thereon;
    a plurality of output shafts, each of the output shafts being provided with a shift driven gear configured to mesh with a corresponding shift driving gear;
    a motor power shaft;
    a first motor gear freely fitted over the motor power shaft and configured to rotate together with one of the input shafts;
    a second motor gear freely fitted over the motor power shaft and configured to rotate together with one of the output shafts; and
    a motor synchronizer disposed on the motor power shaft and between the first and second motor gears.

2. The transmission unit according to claim 1, further comprising:
    a reverse gear freely fitted over the motor power shaft;
    a middle idler configured to mesh with the shift driving gear provided on the one of the input shafts; and
    a reverse idler gear configured to mesh with the reverse gear and to selectively rotate together with the middle idler.

3. The transmission unit according to claim 2, further comprising:

a reverse synchronizer configured to synchronize the middle idler and the reverse idler gear.

4. The transmission unit according to claim 3, wherein the reverse idler gear comprises a gear sleeve and the middle idler is freely fitted over the gear sleeve;
wherein the reverse synchronizer is disposed on the gear sleeve and configured to engage with the middle idler.

5. The transmission unit according to claim 3, wherein the plurality of input shafts comprise a first input shaft and a second input shaft coaxially fitted over the first input shaft;
wherein the plurality of output shafts comprise first and second output shafts disposed parallel to the first and second input shafts.

6. The transmission unit according to claim 5, wherein the plurality of shift driving gears comprise: a first-gear driving gear disposed on the first input shaft, a second-gear driving gear disposed on the second input shaft, a third-gear driving gear disposed on the first input shaft, a fourth-gear driving gear disposed on the second input shaft, and a fifth-gear driving gear disposed on the first input shaft;
wherein the plurality of shift driven gears comprise first-gear to fourth-gear driven gears disposed on the first output shaft, and a fifth-gear driven gear disposed on the second output shaft; and
wherein the power transmission system further comprise a first-third gear synchronizer disposed between the first-gear driven gear and the third-gear driven gear, a second-fourth gear synchronizer disposed between the second-gear driven gear and the fourth-gear driven gear, and a fifth gear synchronizer disposed on a side of the fifth-gear driven gear.

7. The transmission unit according to claim 6, wherein the reverse idler gear is freely fitted over the second output shaft, the middle idler is configured to mesh with the second-gear driving gear, and a transmission gear fixed on the second output shaft is meshed with the second motor gear.

8. The transmission unit according to claim 6, wherein the reverse synchronizer and the fifth gear synchronizer share a shift fork mechanism.

9. The transmission unit according to claim 6, wherein the reverse gear is configured as a duplex gear, the duplex gear comprises a first part to mesh with the reverse idler gear and a second part to mesh with a driven gear of a main reducer of the vehicle.

10. The transmission unit according to claim 5, further comprising a first output gear fixed on the first output shaft and a second output gear fixed on the second output shaft, wherein the first and second output gears are both configured to mesh with the driven gear of the main reducer.

11. A power transmission system for a vehicle, comprising:
a transmission unit according to claim 1; and
a first motor generator configured to rotate together with the motor power shaft of the transmission unit.

12. The power transmission system according to claim 11, wherein the power transmission system further comprises a dual clutch and an engine, wherein the dual clutch comprises: an input terminal connected with the engine, a first output terminal connected with the first input shaft of the transmission unit, and a second output terminal connected with the second input shaft of the transmission unit.

13. The power transmission system according to claim 12, wherein
the engine is configured to transmit a first part of power to wheels of the vehicle via one of the output shafts by engaging the input terminal of the dual clutch with the first output terminal and the second output terminal of the dual clutch simultaneously to drive the vehicle, and to transmit a second part of power to the first motor generator via the motor power shaft to drive the first motor generator to generate electric power.

14. The power transmission system according to claim 12, wherein the engine is configured to transmit power to one of the input shafts of the transmission unit, and to transmit the power to the first motor generator by synchronizing the first motor gear via a motor synchronizer to drive the first motor generator to generate electric power, when the vehicle is in a parking state.

15. The power transmission system according to claim 12, wherein the vehicle is operable in a mechanical reverse mode, an electric reverse mode and a hybrid reverse mode,
wherein when the vehicle is operated in the mechanical reverse mode, the engine is configured to generate a first power, to transmit the first power to one of the input shafts of the transmission unit, and to transmit the first power to the reverse gear via a synchronization of the reverse synchronizer of the transmission unit;
wherein when the vehicle is operated in the electric reverse mode, the first motor generator is configured to generate a second power and transmit the second power to the reverse gear via the synchronization of the reverse synchronizer and a synchronization of the motor synchronizer to the first motor gear; and
wherein when the vehicle is operated in the hybrid reverse mode, the engine is configured to generate a first power, to transmit the first power to one of the input shafts of the transmission unit, and to transmit the first power to the reverse gear via synchronization of the reverse synchronizer; and the first motor generator is configured to generate a second power and to transmit the second power to the reverse gear via the synchronization of the reverse synchronizer and the synchronization of the motor synchronizer to the first motor gear.

16. The power transmission system according to claim 11, further comprising an engine and a dual clutch;
wherein the dual clutch includes an input terminal connected with the engine, a first output terminal connected with the first input shaft of the transmission unit, and a second output terminal connected with the second input shaft of the transmission unit;
wherein the vehicle is operable in a mechanical reverse mode, an electric reverse mode and a hybrid reverse mode;
wherein when the vehicle is operated in the mechanical reverse mode, the engine is configured to generate a first power, to transmit the first power to one of the input shafts of the transmission unit, and to transmit the first power to the reverse gear via a synchronization of the reverse synchronizer of the transmission unit;
wherein when the vehicle is operated in an electric reverse mode, the first motor generator is configured to generate a second power and output the second power from the second output shaft via a synchronization of motor synchronizer to the second motor gear; and
wherein when the vehicle is operated in a hybrid reverse mode, the engine is configured to generate a first power, to transmit the first power to one of the input shafts of the transmission unit, and to transmit the first power to the reverse gear via the synchronization of the reverse synchronizer of the transmission unit; and the first motor generator is configured to generate a second power and output the second power from the second output shaft via the synchronization of motor synchronizer to the second motor gear.

17. The power transmission system according to claim 11, wherein the first motor generator is configured to rotate along a predetermined direction all the time when being operated as a motor or a generator.

18. The power transmission system according to claim 11, wherein during the motor synchronizer switching from engaging with one of the first and second motor gears to engaging with the other of the first and second motor gears, the first motor generator is configured to adjust a rotating speed of the motor power shaft based on a rotating speed of the other of the first and second motor gears.

19. The power transmission system according to claim 11, further comprising a second motor generator, wherein the second motor generator is configured to perform power transmission with a driven gear of a main reducer of the vehicle; or
   wherein the second motor generator is connected with the first output shaft; or
   wherein the second motor generator is connected with the first input shaft; or
   wherein the driven gear of the main reducer is disposed on a differential of the vehicle, and two second motor generators are provided and disposed on two sides of the differential respectively.

20. The power transmission system according to claim 12, wherein the engine and/or the first motor generator is configured to drive a first pair of wheels of the vehicle, and the power transmission system further comprises:
   i. a third motor generator configured to rotate together with one of a second pair of wheels of the vehicle;
   ii. a fourth motor generator configured to rotate together with the other of the second pair of wheels of the vehicle,
   iii. an antiskid synchronizer configured to selectively synchronize the second pair of wheels,
wherein the first pair of wheels are one of front wheels and rear wheels of the vehicle, and the second pair of wheels are the other of the front wheels and the rear wheels.

21. The power transmission system according to claim 20, further comprising a first gear disposed on a first power output shaft corresponding to the third motor generator;
   a second gear disposed on a first drive shaft connected with the one of the second pair of wheels corresponding to the third motor generator;
   a third gear configured to mesh with the first gear;
   a fourth gear coaxially arranged with the third gear and configured to mesh with the second gear and rotate synchronously with the third gear;
   a fifth gear disposed on a second power output shaft corresponding to the fourth motor generator;
   a sixth gear disposed on a second drive shaft connected with a wheel corresponding to the fifth motor generator;
   a seventh gear configured to mesh with the fifth gear;
   an eighth gear coaxially arranged with the seventh gear and configured to mesh with the sixth gear and rotate synchronously with the seventh gear,
   wherein the antiskid synchronizer is disposed on the first drive shaft and configured to selectively engage with the sixth gear; or
   wherein the antiskid synchronizer is disposed on the first power output shaft corresponding to the third motor generator and is configured to selectively engage with the fifth gear; or
   wherein the third gear and the fourth gear are fixed on a first gear shaft, the seventh gear and the eighth gear are fixed on a second gear shaft, and the antiskid synchronizer is disposed on the first gear shaft and configured to selectively engage with the seventh gear.

22. The power transmission system according to claim 20, wherein the first power output shaft is coaxially connected with a wheel corresponding to the first output shaft, the second power output shaft is coaxially connected with a wheel corresponding to the second output shaft, the antiskid synchronizer is disposed on the first power output shaft and configured to engage with the second power output shaft.

23. A vehicle comprising a power transmission system for a vehicle according to claim 11.

* * * * *